US008995245B2

(12) United States Patent
Nakamura et al.

(10) Patent No.: US 8,995,245 B2
(45) Date of Patent: Mar. 31, 2015

(54) APPARATUS FOR RECORDING OPTICAL INFORMATION IN A HOLOGRAM, APPARATUS FOR REPRODUCING OPTICAL INFORMATION STORED IN A HOLOGRAM, AND A METHOD FOR RECORDING OPTICAL INFORMATION IN, OR REPRODUCING OPTICAL INFORMATION FROM, A HOLOGRAM

(71) Applicant: Hitachi Consumer Electronics Co., Ltd., Chiyoda-ku, Tokyo (JP)

(72) Inventors: Yusuke Nakamura, Ebina (JP); Toshiki Ishii, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/675,062

(22) Filed: Nov. 13, 2012

(65) Prior Publication Data

US 2013/0128714 A1    May 23, 2013

(30) Foreign Application Priority Data

Nov. 18, 2011   (JP) .................................. 2011-252209

(51) Int. Cl.
*G11B 7/0065* (2006.01)
*G11B 7/1392* (2012.01)

(52) U.S. Cl.
CPC .......... *G11B 7/0065* (2013.01); *G11B 7/13925* (2013.01)
USPC ......................................................... 369/103

(58) Field of Classification Search
CPC combination set(s) only.
See application file for complete search history.

(56) References Cited

U.S. PATENT DOCUMENTS

| 8,416,480 B2 * | 4/2013 | Tanaka et al. .................... 359/32 |
| 2011/0273754 A1 * | 11/2011 | Shimada et al. ................. 359/11 |

FOREIGN PATENT DOCUMENTS

| JP | 2007294051 A * | 11/2007 | ........... G11B 7/0065 |
| JP | 2010-61718 | 3/2010 | |

OTHER PUBLICATIONS

English machine translation of JP 2007-294051 A (Ishii et al., Hologram Reproduction Wavefront Correcting Method and Device, published Nov. 2007).*

* cited by examiner

*Primary Examiner* — Wayne Young
*Assistant Examiner* — Mark Fischer
(74) *Attorney, Agent, or Firm* — Baker Botts L.L.P.

(57) ABSTRACT

The above-described problem can be solved by the following optical-information reproducing apparatus: An optical-information reproducing apparatus for reproducing a hologram storage medium into which an interference pattern is recorded as a hologram, the interference pattern being formed by causing a reference beam and a signal beam to interfere with each other, the optical-information reproducing apparatus, including an optical detector for detecting a reproduced beam, the reproduced beam being acquired by illuminating the recorded hologram with the reference beam, an optical element for generating a first reference beam and a second reference beam by branching the reference beam, a wavefront detector for detecting wavefront aberration of the reference beam by causing the first reference beam and the second reference beam to interfere with each other, and a wavefront compensator for compensating the wavefront of the reference beam, wherein the wavefront compensator is adjusted based on an output of the wavefront detector.

7 Claims, 21 Drawing Sheets

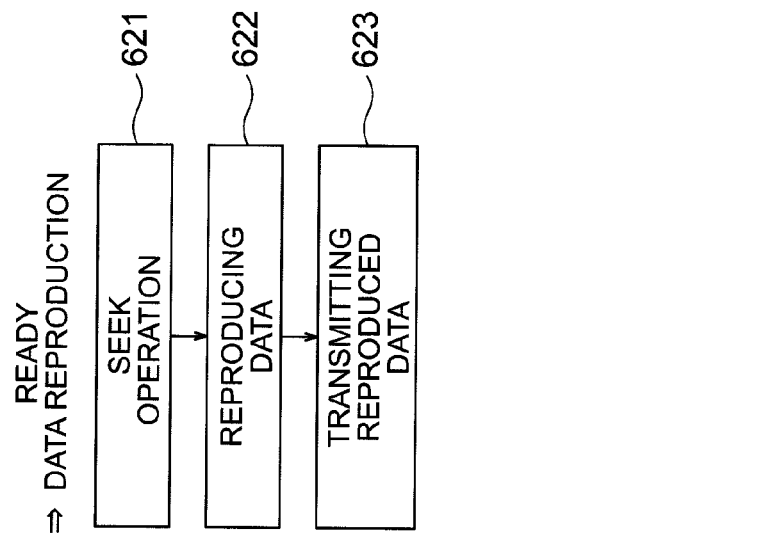
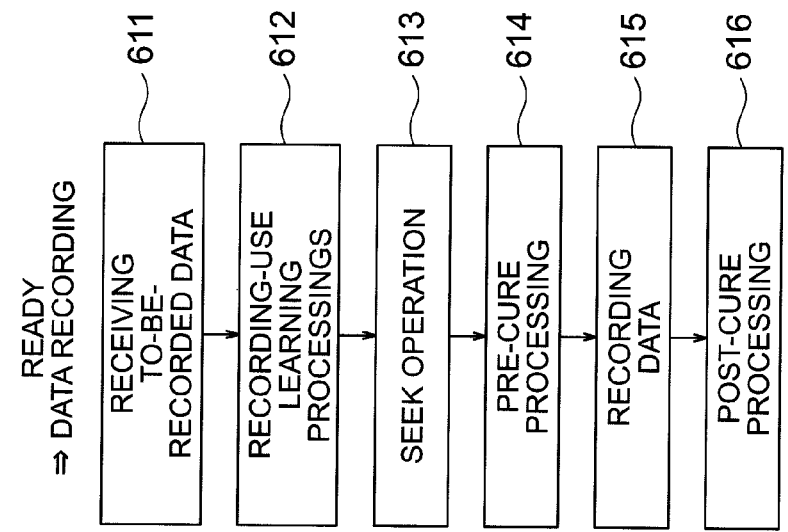
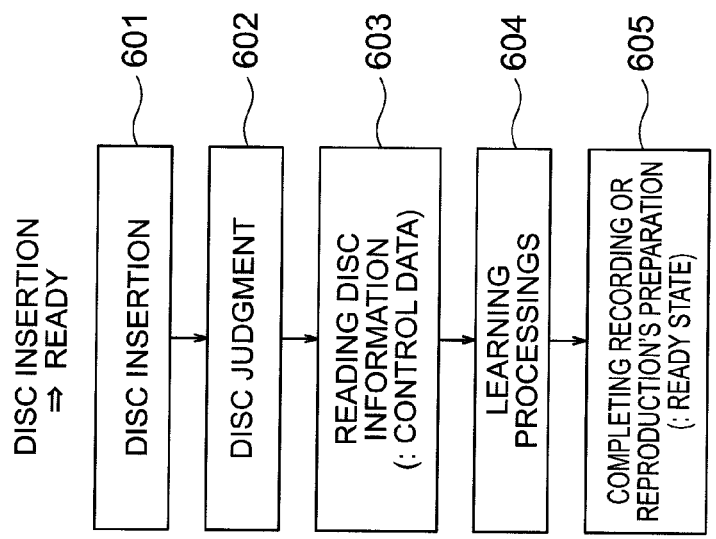

6λ
5λ
4λ
3λ
2λ
λ
0

LARGE

COMPENSATION
AMOUNT

SMALL

FIG. 18
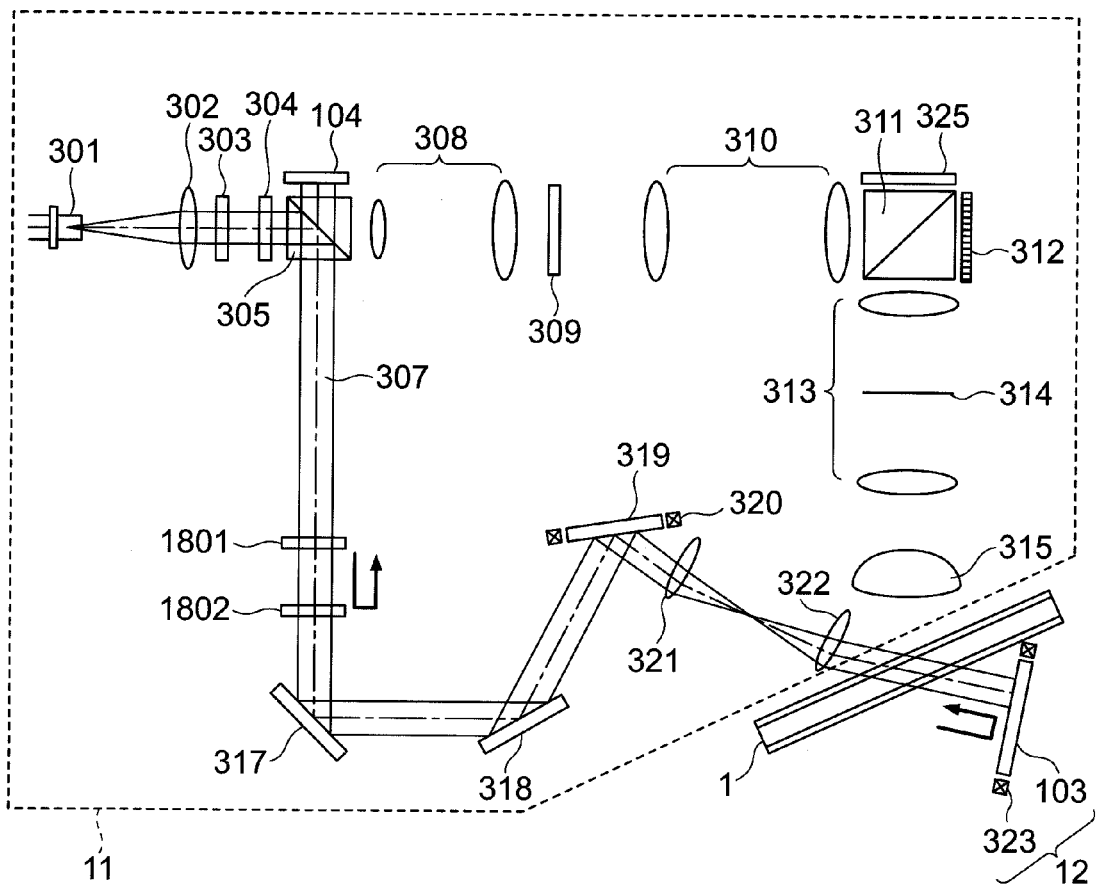
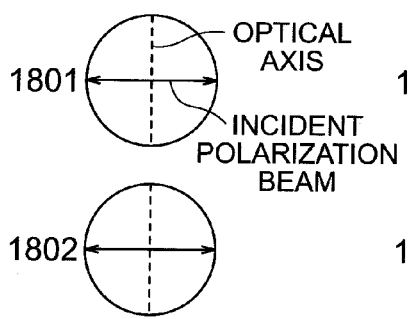
FIG. 19A
RECORDING TIME
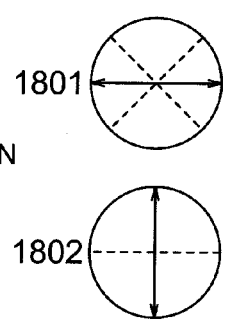
FIG. 19B
REPRODUCING TIME
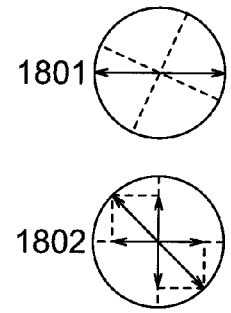
FIG. 19C
ABERRATION-DETECTING /COMPENSATING TIME

APPARATUS FOR RECORDING OPTICAL INFORMATION IN A HOLOGRAM, APPARATUS FOR REPRODUCING OPTICAL INFORMATION STORED IN A HOLOGRAM, AND A METHOD FOR RECORDING OPTICAL INFORMATION IN, OR REPRODUCING OPTICAL INFORMATION FROM, A HOLOGRAM

BACKGROUND OF THE INVENTION

The present invention relates to an optical-information recording apparatus, an optical-information reproducing apparatus, an optical-information recording/reproducing apparatus, an optical-information recording method, an optical-information reproducing method, and an optical-information recording/reproducing method.

At present, the Blu-ray Disc™ standard using the blue-violet semiconductor laser has made the about-50-GB-recording-density-equipped optical discs commercially available even in their consumer products. In the coming years, this large-capacity implementation of the optical discs is desired up to the same extent as that of the HDD (:Hard Disk Drive), i.e., 100 GB to 1 TB.

Implementing an ultra-high density like this using the optical discs, however, requires a high-density-implementing technology which is based on some new scheme, and which is different from the conventional high-density-implementing technology. Here, this conventional technology is based on the shorter-wavelength implementation and the objective lens' high-NA implementation.

Various researches about the next-generation storage technologies are underway at present. Of these technologies, attention is focused on the holographic recording technology for recording digital information by taking advantage of holography.

The holographic recording technology is the following technology: Namely, a signal beam is equipped with information on page data which is modulated in a two-dimensional manner by a spatial light modulator. Then, this signal beam is superimposed on a reference beam inside a storage medium. At this time, an interference-fringe pattern is formed as a result of this superimposition. Moreover, the information is recorded into the storage medium in such a manner that a refractive-index modulation is caused to occur inside the storage medium by this interference-fringe pattern.

At the time of reproducing the information, the storage medium is illuminated with the reference beam used at the time of recording the information. As a result, the hologram recorded into the storage medium operates like a diffraction grating, thereby generating a diffracted light. This diffracted light is reproduced as the same light, including the signal beam and phase information recorded.

The reproduced signal beam is detected in a two-dimensional manner at a high speed, using an optical detector such as CMOS or CCD. In this way, the holographic recording technology makes it possible to record two-dimensional information at one stroke into an optical storage medium using a single hologram. Moreover, this technology makes it possible to reproduce this two-dimensional information recorded. Furthermore, this technology makes it possible to overwrite plural pieces of page data at a certain location of the storage medium. These features allow accomplishment of large-capacity and high-speed recording/reproduction of information.

As a holographic recording/reproducing technology as is described above, there exists, e.g., JP-A-2010-61718. In JP-A-2010-61718, the disclosure has been made concerning a technology for solving "the following problem: Namely, in an optical apparatus, while a light beam is traveling along its optical path, the wavefront of the light beam is deformed by optical elements such as lenses. Moreover, between mutually different optical apparatuses, even if deployments of the optical systems are made mutually identical to each other, the ways in which the wavefronts of the light beams are deformed become different from each other. Accordingly, in general, between a holographic recording apparatus and a holographic reproducing apparatus as well, the wavefront profiles of reference beams become different from each other. On account of this, between the signal recording time and the signal reproducing time, the wavefront profiles of the reference beams do not become one and the same wavefront profile. As a result, the SNR (i.e., SN ratio) of the reproduced data becomes lowered." by employing "the following configuration: Namely, along each of optical paths of the reference beams, there are provided and arranged an optical detector for detecting the wavefront of a reference beam, and a wavefront controller for adjusting the wavefront of the reference beam. In the wavefront controller, the wavefront profile of the reference beam detected by the optical detector is adjusted so that this wavefront profile becomes the wavefront profile of the reference beam used at the signal recording time into the holographic storage medium":

SUMMARY OF THE INVENTION

By the way, in JP-A-2010-61718, the disclosure has been made concerning the following method: Namely, the wavefront of the reference beam, which enters the storage medium, is adjusted so that this wavefront coincides with the wavefront of the reference beam used at the signal recording time. Actually, however, there has existed the following further problem: Namely, this wavefront is disturbed by such factors as a deformation of the storage medium.

In view of this situation, an object of the present invention is to provide a reference-beam wavefront-aberration detection method and compensation method which allows implementation of a further enhancement in the reproduction quality.

The above-described object is accomplished by, as its example, splitting the reference beam, and measuring the mutual interference between the resultant reference beams split.

According to the present invention, it becomes possible to enhance the reference-beam wavefront-aberration detection accuracy in the hologram-based recording/reproducing processing. Moreover, it becomes possible to improve the reproduction performance by executing the wavefront-aberration compensation properly.

Other objects, features and advantages of the invention will become apparent from the following description of the embodiments of the invention taken in conjunction with accompanying drawings.

BRIEF DESCRIPTION OF THE DRAWINGS

FIGS. 6A-6C are schematic diagrams for illustrating an embodiment of the operation flows of the optical-information recording/reproducing apparatus.

FIG. 18 is a schematic diagram for illustrating an embodiment of the pickup inside the optical-information recording/reproducing apparatus.

FIGS. 19A-19C are schematic diagrams for illustrating an example of the optical-element deployment inside the pickup.

DETAILED DESCRIPTION OF THE INVENTION

Figure 1:
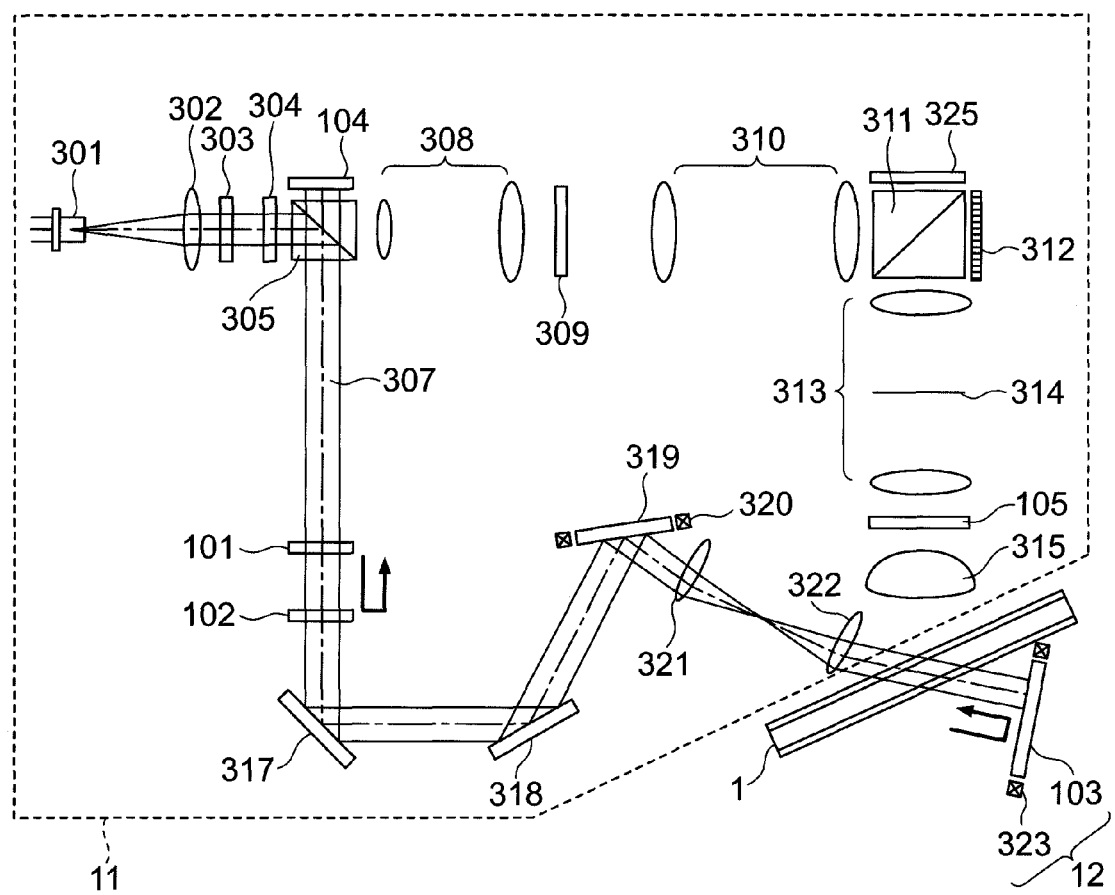
FIG. 1 is a schematic diagram for illustrating an embodiment of a pickup inside an optical-information recording/reproducing apparatus.

Hereinafter, referring to the drawings, the explanation will be given below concerning embodiments of the present invention.

Embodiment 1

Figure 2:
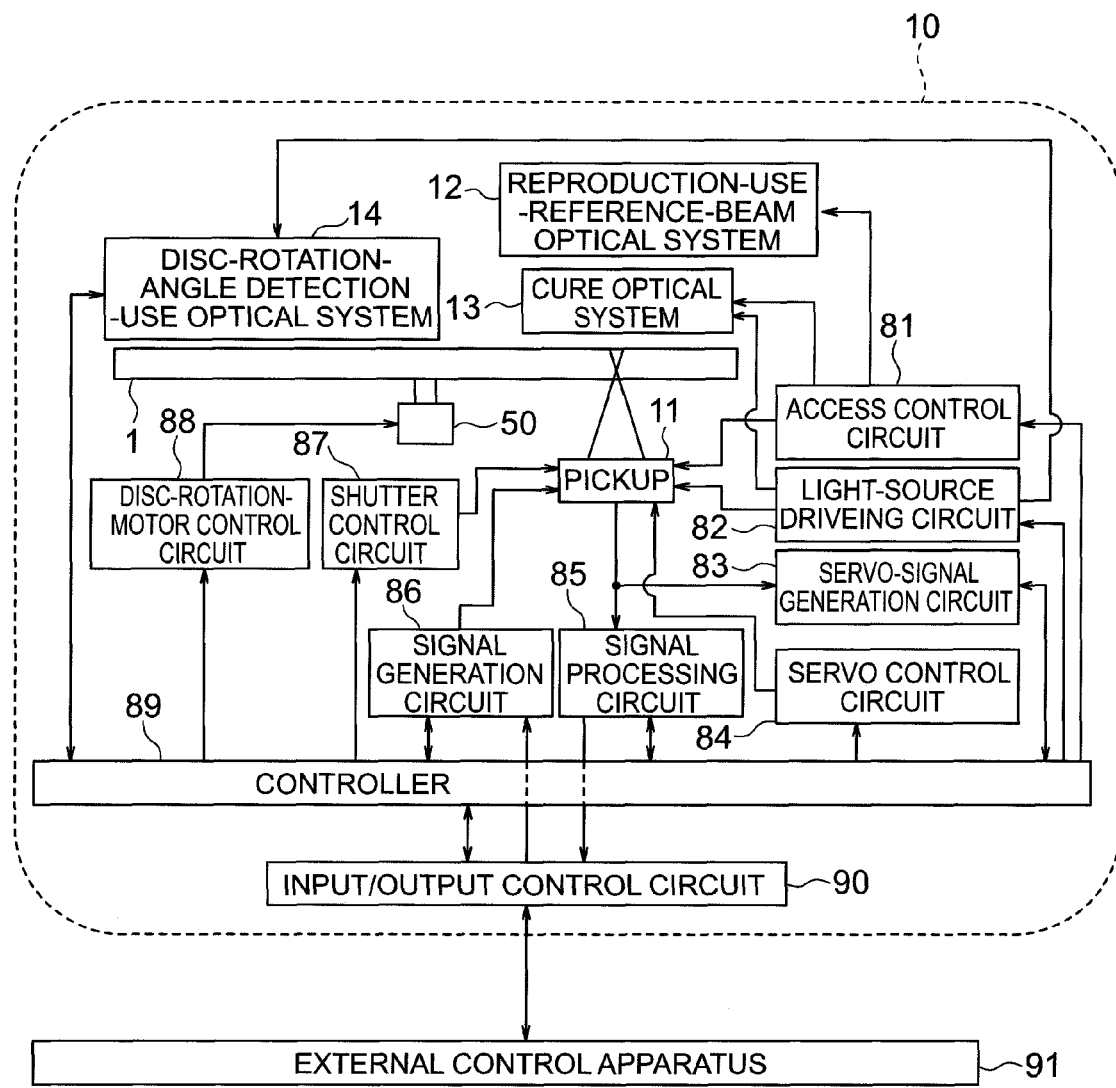
FIG. 2 is a schematic diagram for illustrating an embodiment of the optical-information recording/reproducing apparatus.

In accordance with the accompanying drawings, the explanation will be given below regarding an embodiment of the present invention. FIG. 2 is a block diagram for illustrating an optical-information recording/reproducing apparatus for an optical-information storage medium for recording and/or reproducing digital information by taking advantage of holography.

The optical-information recording/reproducing apparatus 10 is connected to an external control apparatus 91 via an input/output control circuit 90. When performing the recording, the optical-information recording/reproducing apparatus 10 receives an information signal to be recorded from the external control apparatus 91 via the input/output control circuit 90. When performing the reproduction, the optical-information recording/reproducing apparatus 10 transmits the reproduced information signal to the external control apparatus 91 via the input/output control circuit 90.

The optical-information recording/reproducing apparatus 10 includes a pickup 11, a reproduction-use-reference-beam optical system 12, a cure optical system 13, a disc-rotation-angle detection-use optical system 14, and a rotation motor 50. The optical-information storage medium 1 is so configured as to be made rotatable by the rotation motor 50.

The pickup 11 plays the following role: Namely, the pickup 11 records digital information into the optical-information storage medium 1 by emitting a reference beam and a signal beam to the storage medium 1, and by taking advantage of the holography. At this time, the information signal to be recorded is transmitted into a spatial light modulator inside the pickup 11 by a controller 89 via a signal generation circuit 86. The information signal beam is modulated by the spatial light modulator.

When reproducing the information recorded into the optical-information storage medium 1, the reproduction-use-reference-beam optical system 12 generates an optical wave for causing the reference beam, which is emitted from the pickup 11, to enter the optical-information storage medium 1 in the direction opposite to the one when the information is recorded. Moreover, a reproduced beam, which is reproduced by the reproduction-use reference beam, is detected by an optical detector inside the pickup 11 (, which will be described later). Then, the signal is reproduced by a signal processing circuit 85.

The illumination time, during which the optical-information storage medium 1 is illuminated with the reference beam and the signal beam, can be adjusted as follows: Namely, the open/close time of a shutter inside the pickup 11 is controlled by the controller 89 via a shutter control circuit 87.

The cure optical system 13 plays a role of generating an optical beam which is used for the pre-cure and post-cure of the optical-information storage medium 1. The pre-cure is the following before-processing: Namely, when recording information at a desired position within the optical-information storage medium 1, before the desired position is illuminated with the reference beam and the signal beam, the desired position is illuminated with a predetermined optical beam in advance. The post-cure is the following after-processing: Namely, after the information has been recorded into the desired position within the optical-information storage medium 1, the desired position is illuminated with a predetermined optical beam in order to make it impossible to perform an additional recording therein.

The disc-rotation-angle detection-use optical system 14 is used for detecting the rotation angle of the optical-information storage medium 1. When adjusting the optical-information storage medium 1 at a predetermined rotation angle, a signal which corresponds to the rotation angle is detected using the disc-rotation-angle detection-use optical system 14. Subsequently, using the signal detected, the rotation angle of the optical-information storage medium 1 can be controlled by the controller 89 via a disc-rotation-motor control circuit 88.

A light-source driving circuit 82 supplies a predetermined light-source driving current to light sources set up inside the pickup 11, the cure optical system 13, and the disc-rotation-angle detection-use optical system 14. Each of the light sources can emit an optical beam with a predetermined light amount.

Also, the pickup 11 and the cure optical system 13 are equipped with a mechanism for allowing their positions to slide in the radial direction of the optical-information storage medium 1. This mechanism performs their position controls via an access control circuit 81.

By the way, in the recording technology which takes advantage of the principle of the holography-based angle-multiplexing recording, the following tendency exists: Namely, the tolerable error for a shift of the reference-beam angle becomes exceedingly small.

Accordingly, the following countermeasures become necessary: Namely, a mechanism for detecting the shift amount of the reference-beam angle is set up inside the pickup 11. Moreover, a servo-control-use signal is generated in a servo-signal generation circuit 83. Furthermore, a servo mechanism for correcting the shift amount is set up inside the optical-information recording/reproducing apparatus 10 via a servo control circuit 84.

Also, the pickup 11, the cure optical system 13, and the disc-rotation-angle detection-use optical system 14 may be simplified by integrating some of their optical configurations, or all of their optical configurations into a single configuration.

Figure 3:
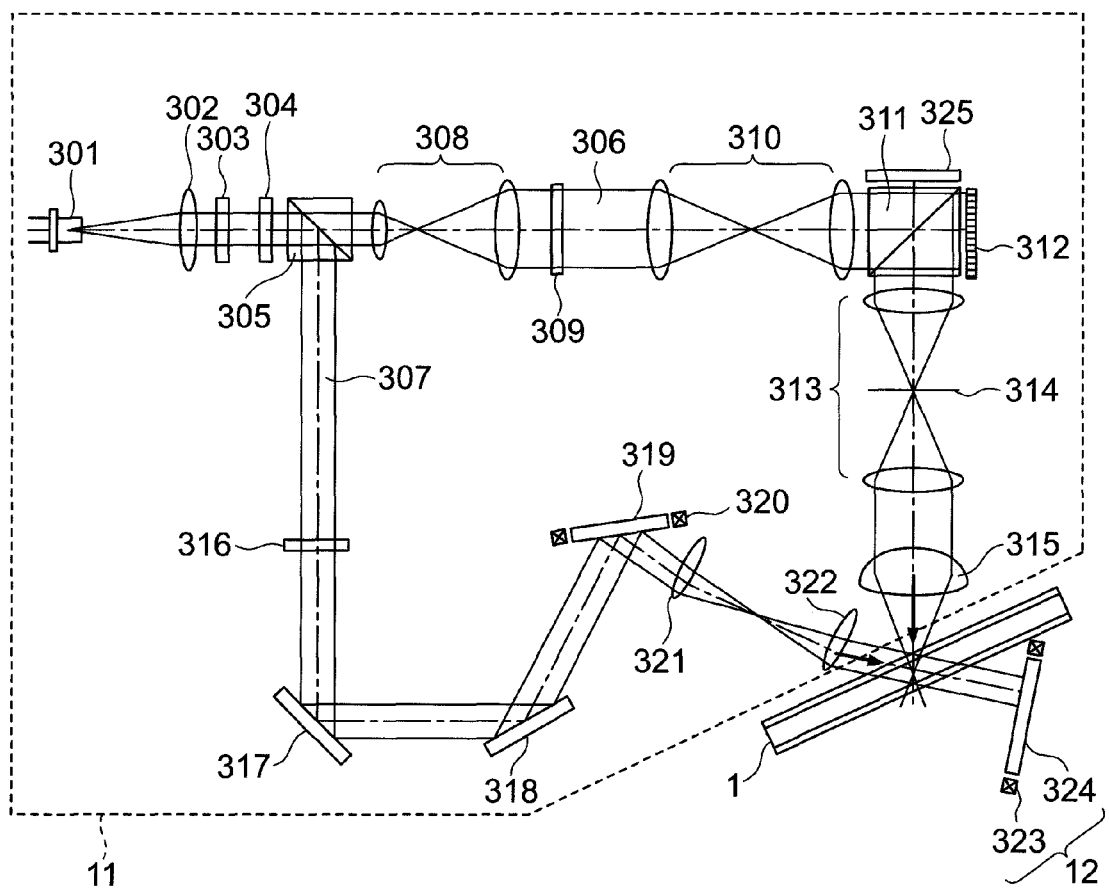
FIG. 3 is a schematic diagram for illustrating an embodiment of the pickup inside the optical-information recording/reproducing apparatus.

FIG. 3 illustrates the recording principle in an example of the basic optical-system configuration of the pickup 11 in the optical-information recording/reproducing apparatus 10. An optical beam, which is emitted from a light-source 301, passes through a collimator lens 302, then entering a shutter 303. When the shutter 303 is opened, the optical beam passes through the shutter 303. After that, the polarization direction of the optical beam is controlled by an optical element 304 so that the light-amount ratio between the p polarization and the s polarization becomes equal to a desired ratio. Here, the optical element 304 is constituted by, e.g., a half-wavelength plate. Still after that, the optical beam enters a PBS (: Polarization Beam Splitter) prism 305.

The optical beam, which has passed through the PBS prism 305, operates as a signal beam 306. Moreover, the optical-beam diameter of the signal beam 306 is expanded by a beam expander 308. After that, the signal beam 306 passes through a phase mask 309, relay lenses 310, and a PBS prism 311, then entering a spatial light modulator 312.

The signal beam, to which information is added by the spatial light modulator 312, is reflected by the PBS prism 311, then propagating through relay lenses 313 and a spatial filter 314. After that, the signal beam is converged into the optical-information storage medium 1 by an objective lens 315.

Meanwhile, the optical beam, which is reflected by the PBS prism 305, operates as a reference beam 307. Moreover, the polarization direction of the reference beam 307 is set into a predetermined polarization direction by a polarization-direction conversion element 316, depending on whether the case is the recording time or the reproducing time. After that, the reference beam enters a galvanometer mirror 319 by way of a mirror 317 and a mirror 318. The angle of the galvanometer mirror 319 is made adjustable by an actuator 320. Consequently, the incident angle of the reference beam, which is to enter the optical-information storage medium 1 after passing through a lens 321 and a lens 322, can be set at a desired angle. Incidentally, in order to set the incident angle of the reference beam, an element for converting the wavefront of the reference beam is also usable, instead of using the galvanometer mirror.

In this way, the signal beam and the reference beam are caused to enter the optical-information storage medium 1 in such a manner as to be superimposed on each other. As a result, an interference-fringe pattern is formed inside the storage medium. Writing this pattern into the storage medium allows the recording of the information therein. Also, the galvanometer mirror 319 makes it possible to change the incident angle of the reference beam which is to enter the optical-information storage medium 1. This feature allows implementation of the recording based on the angle multiplexing.

Hereinafter, a hologram is assumed in which information is recorded into one and the same area thereof in such a manner that the reference-beam angle is changed. Then, a partial hologram corresponding to any one of the reference-beam angles changed will be referred to as "a page". Also, the set of the pages which are angle-multiplexed into the one and the same area will be referred to as "a book".

Figure 4:
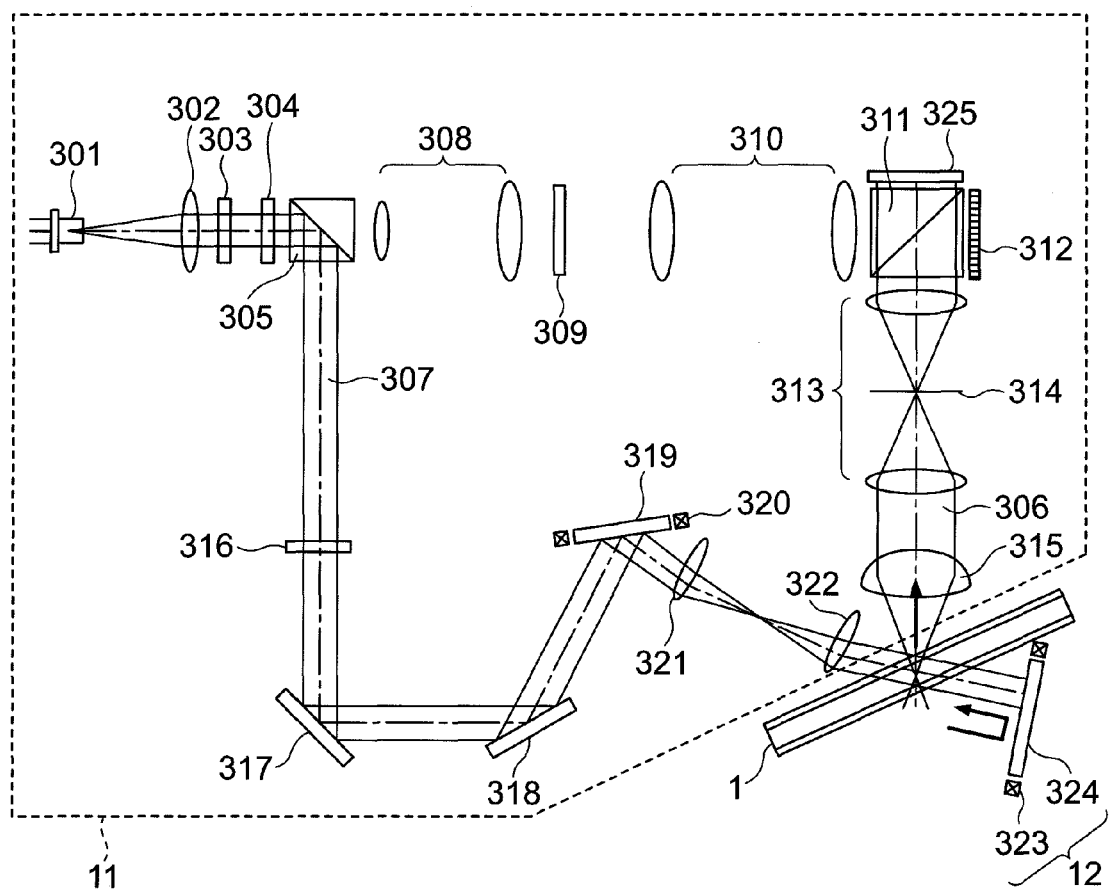
FIG. 4 is a schematic diagram for illustrating an embodiment of the pickup inside the optical-information recording/reproducing apparatus.

FIG. 4 illustrates the reproducing principle in the example of the basic optical-system configuration of the pickup 11 in the optical-information recording/reproducing apparatus 10. When reproducing the information recorded into the optical-information storage medium 1, as was described earlier, the reference beam is guided to enter the optical-information storage medium 1. Moreover, the reference beam, which has passed through the optical-information storage medium 1, is reflected by a galvanometer mirror 324 whose angle is made adjustable by an actuator 323. In this way, a reproduction-use reference beam is generated.

Furthermore, a reproduced beam, which is reproduced by this reproduction-use reference beam, propagates through the objective lens 315, the relay lenses 313, and the spatial filter 314. After that, the reproduced beam passes through the PBS prism 311, then entering an optical detector 325. In this way, the recorded signal can be reproduced. The units mentionable as the optical detector 325 are photographing elements such as, e.g., CMOS image sensor and CCD image sensor. Whatever element, however, is allowable as long as it is capable of reproducing the page data.

Figure 5:
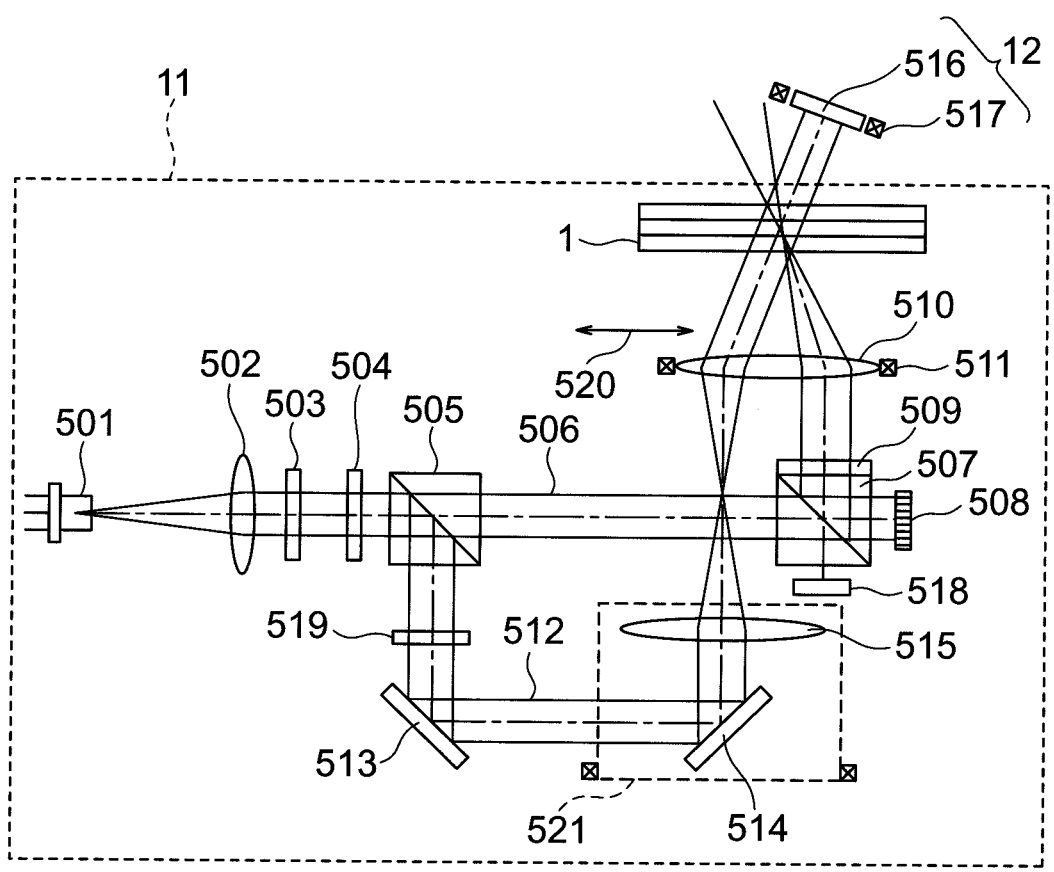
FIG. 5 is a schematic diagram for illustrating an embodiment of the pickup inside the optical-information recording/reproducing apparatus.

FIG. 5 is a diagram for illustrating another configuration of the pickup 11. In FIG. 5, an optical beam, which is emitted from a light-source 501, passes through a collimator lens 502, then entering a shutter 503. When the shutter 503 is opened, the optical beam passes through the shutter 503. After that, the polarization direction of the optical beam is controlled by an optical element 504 so that the light-amount ratio between the p polarization and the s polarization becomes equal to a desired ratio. Here, the optical element 504 is constituted by, e.g., a half-wavelength plate. Still after that, the optical beam enters a polarization beam splitter 505.

The optical beam, which has passed through the polarization beam splitter 505, enters a spatial light modulator 508 via a polarization beam splitter 507. The signal beam 506, to which information is added by the spatial light modulator 508, is reflected by the polarization beam splitter 507. Moreover, the signal beam propagates through an angle filter 509 for permitting only a predetermined incident angle of optical beam to pass therethrough. After that, the signal beam is converged into the optical-information storage medium 1 by an objective lens 510.

Meanwhile, the optical beam, which is reflected by the polarization beam splitter 505, operates as a reference beam 512. Furthermore, the polarization direction of the reference beam 512 is set into a predetermined polarization direction by a polarization-direction conversion element 519, depending on whether the case is the recording time or the reproducing time. After that, the reference beam enters a lens 515 by way of a mirror 513 and a mirror 514. The lens 515 plays a role of converging the reference beam 512 onto a back-focus plane of the objective lens 510. Subsequently, the reference beam, which is temporarily converged onto the back-focus plane of the objective lens 510, is caused to become a parallel beam again by the objective lens 510. The reference beam, then, enters the optical-information storage medium 1.

Here, the objective lens 510 or an optical block 521 is drivable in a direction which is denoted by, e.g., a reference numeral 520. Then, the position of the objective lens 510 or the optical block 521 is shifted along the driving direction 520. This shifting operation changes the relative position relationship between the objective lens 510 and the reference-beam-converged point on the back-focus plane of the objective lens 510. Consequently, the incident angle of the reference beam, which is to enter the optical-information storage medium 1, can be set at a desired angle. Incidentally, the incident angle of the reference beam may be set at a desired angle by driving the mirror 514 using an actuator, instead of driving the objective lens 510 or the optical block 521.

In this way, the signal beam and the reference beam are caused to enter the optical-information storage medium 1 in such a manner as to be superimposed on each other. As a result, an interference-fringe pattern is formed inside the storage medium. Writing this pattern into the storage medium allows the recording of the information therein. Also, by shifting the position of the objective lens 510 or the optical block 521 along the driving direction 520, it becomes possible to change the incident angle of the reference beam which is to enter the optical-information storage medium 1. This feature allows implementation of the recording based on the angle multiplexing.

When reproducing the information recorded into the optical-information storage medium 1, as described earlier, the reference beam is guided to enter the optical-information storage medium 1. Moreover, the reference beam, which has passed through the optical-information storage medium 1, is reflected by a galvanometer mirror 516. In this way, a reproduction-use reference beam is generated. Furthermore, a reproduced beam, which is reproduced by this reproduction-use reference beam, propagates through the objective lens 510 and the angle filter 509. After that, the reproduced beam passes through the polarization beam splitter 507, then entering an optical detector 518. In this way, the recorded signal can be reproduced.

The optical system illustrated in FIG. 5 is so configured as to cause the signal beam and the reference beam to enter the one and the same objective lens. As compared with the optical-system configuration illustrated in FIG. 3, the employment of this configuration exhibits an advantage of being capable of downsizing the optical system significantly.

FIGS. 6A-6C illustrate the operation flows for the recording/reproducing operations in the optical-information recording/reproducing apparatus 10. Here, in particular, the explanation will be given regarding the recording/reproducing flows which take advantage of the holography.

FIG. 6A illustrates the operation flow until a state where, after the optical-information storage medium 1 is inserted into the optical-information recording/reproducing apparatus 10, the preparation for the recording or the reproduction is completed. FIG. 6B illustrates the operation flow ranging from the preparation-completed state until a state where information is recorded into the optical-information storage medium 1. FIG. 6C illustrates the operation flow ranging from the preparation-completed state until a state where the information recorded into the optical-information storage medium 1 is reproduced.

As illustrated in FIG. 6A, when the optical-information storage medium 1 is inserted into the optical-information recording/reproducing apparatus 10 (: 601), the apparatus 10 makes a disc judgment as to whether or not the optical-information storage medium 1 inserted therein is an optical-information storage medium for recording/reproducing digital information by taking advantage of the holography (: 602).

If, as a result of the disc judgment, it is judged that the medium 1 is the optical-information storage medium for recording/reproducing the digital information by taking advantage of the holography, the optical-information recording/reproducing apparatus 10 reads control data provided in the optical-information storage medium (: 603). This means that the apparatus 10 acquires, e.g., information about the optical-information storage medium and information about respective types of setting conditions at the recording or reproducing time.

After reading the control data, the optical-information recording/reproducing apparatus 10 performs learning processings associated with respective types of adjustments based on the control data, and associated with the pickup 11 (: 604). In this way, the optical-information recording/reproducing apparatus 10 completes the preparation for the recording or the reproduction (: 605).

The operation flow ranging from the preparation-completed state until the state where information is recorded into the optical-information storage medium is as follows, as is illustrated in FIG. 6B: Namely, first, the apparatus 10 receives data to be recorded (: 611), then transmitting information corresponding to the data into the spatial light modulator inside the pickup 11.

After that, in order to be able to record high-quality information into the optical-information storage medium, the apparatus 10 performs respective types of recording-use learning processings in advance (: 612). Here, these learning processings are, e.g., power optimization of the light-source 301 and optimization of the exposure time by the shutter 303, depending on the requirements concerned.

After that, in a seek operation (: 613), the apparatus 10 controls the access control circuit 81, thereby positioning the positions of the pickup 11 and the cure optical system 13 at a predetermined position of the optical-information storage medium 1. If the optical-information storage medium 1 is equipped with address information, the apparatus 10 reproduces the address information, then confirming whether or not they are positioned at the objective position. Moreover, if they are not deployed at the objective position, the apparatus 10 calculates a shift amount relative to the predetermined position, then repeating the positioning operation again.

After that, the apparatus 10 pre-cures the predetermined area by using an optical beam emitted from the cure optical system 13 (: 614). Furthermore, the apparatus 10 records the data by using the reference beam and the signal beam which are emitted from the pickup 11 (: 615).

After recording the data, the apparatus 10 post-cures the predetermined area by using an optical beam emitted from the cure optical system 13 (: 616). It is also allowable to verify the data depending on the requirements.

The operation flow ranging from the preparation-completed state until the state where the information recorded into the optical-information storage medium 1 is reproduced is as follows, as is illustrated in FIG. 6C: Namely, first, in a seek operation (: 621), the apparatus 10 controls the access control circuit 81, thereby positioning the positions of the pickup 11 and the reproduction-use-reference-beam optical system 12 at the predetermined position of the optical-information storage medium 1. If the optical-information storage medium 1 is equipped with the address information, the apparatus 10 reproduces the address information, then confirming whether or not they are positioned at the objective position. Moreover, if they are not deployed at the objective position, the apparatus 10 calculates a shift amount relative to the predetermined position, then repeating the positioning operation again.

After that, the apparatus 10 reproduces and reads the information, which is recorded into the optical-information storage medium 1, by emitting the reference beam to the storage medium 1 from the pickup 11 (: 622). The apparatus 10, then, transmits the reproduced data (: 623).

Figure 9A:
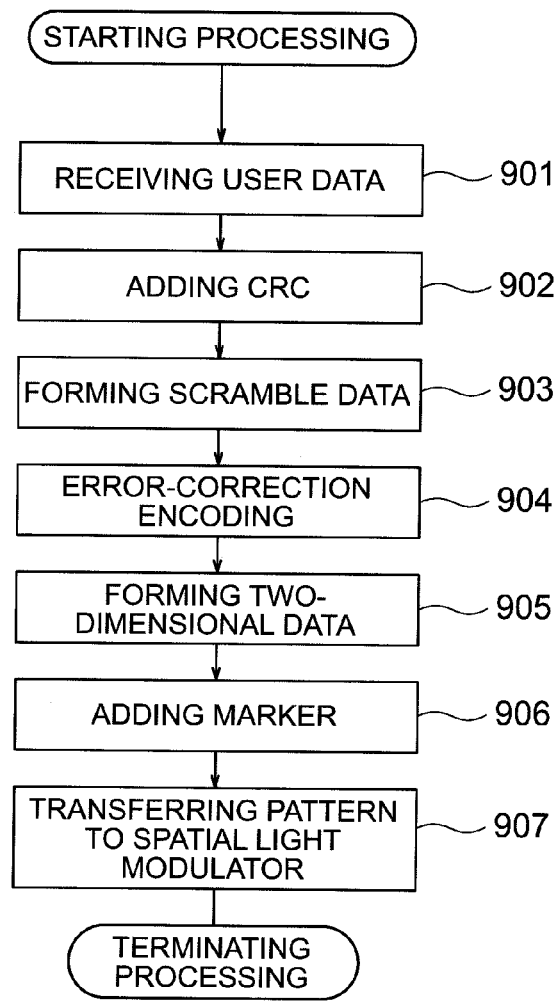
FIGS. 9A and 9B are schematic diagrams for illustrating an embodiment of the operation flows of the signal generation circuit and the signal processing circuit.
Figure 9B:
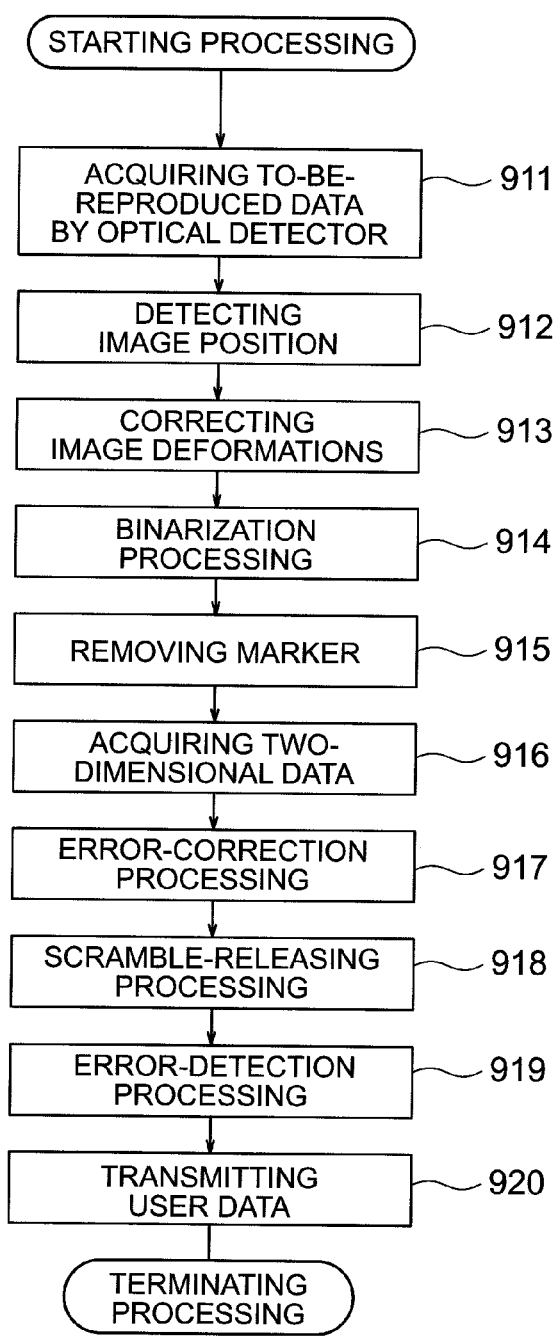

FIGS. 9A and 9B illustrate the data processing flows at the recording and reproducing times. FIG. 9A illustrates the data processing flow at the recording time in the signal generation circuit 86. This flow continues until a state where, after the data to be recorded is received in the input/output control circuit 90 (: 611), the data to be recorded is converted into two-dimensional data on the spatial light modulator 312. Meanwhile, FIG. 9B illustrates the data processing flow at the reproducing time in the signal processing circuit 85. This flow continues until a state where, after the two-dimensional data is detected by the optical detector 325, the reproduced data is transmitted in the input/output control circuit 90 (: 623).

Referring to FIG. 9A, the explanation will be given below regarding the data processing flow at the recording time. The user data is received (: 901). Then, the user data is divided into a plurality of data strings, and the CRC implementation of each data string is executed so that a reproducing-time error detection is executable (: 902). Next, the on-pixel number and the off-pixel number are made equal to each other. Moreover, a scramble processing, which adds a pseudo-random-number data string to each data string, is applied thereto in order to prevent the repetition of a same pattern (: 903). After that, an error-correction encoding such as Reed-Solomon Coding is executed so that a reproducing-time error correction is executable (: 904). Next, this data string is converted into M×N two-dimensional data. Then, this conversion is repeated by the amount of 1-page data, thereby constituting the two-dimensional data by the amount of 1 page (: 905). Furthermore, a marker, which becomes the criterion in the reproducing-time image-position detection and image-deformation correction, is added to the two-dimensional data constituted in this way (: 906). Then, the two-dimensional data is transferred to the spatial light modulator 312 (: 907).

Next, referring to FIG. 9B, the explanation will be given below regarding the data processing flow at the reproducing time. The two-dimensional image data detected by the optical detector 325 is transferred to the signal processing circuit 85 (: 911). Then, the image position is detected in such a manner that the marker involved in this image data is used as the criterion (: 912). Next, the image deformations, such as the image's inclination, magnification, and distortion, are corrected (: 913). After that, a binarization processing is executed to the image data (: 914), and the marker is removed therefrom (: 915), thereby acquiring the two-dimensional data by the amount of 1 page (: 916). Moreover, after the two-dimensional data acquired in this way has been converted into a plurality of data strings, an error-correction processing is executed thereto (: 917), thereby removing a parity data string therefrom. Next, a scramble-releasing processing is applied thereto (: 918). Furthermore, CRC parity is deleted by executing the CRC-based error-detection processing (: 919). After that, the user data is transmitted via the input/output control circuit 90 (: 920).

Figure 7:
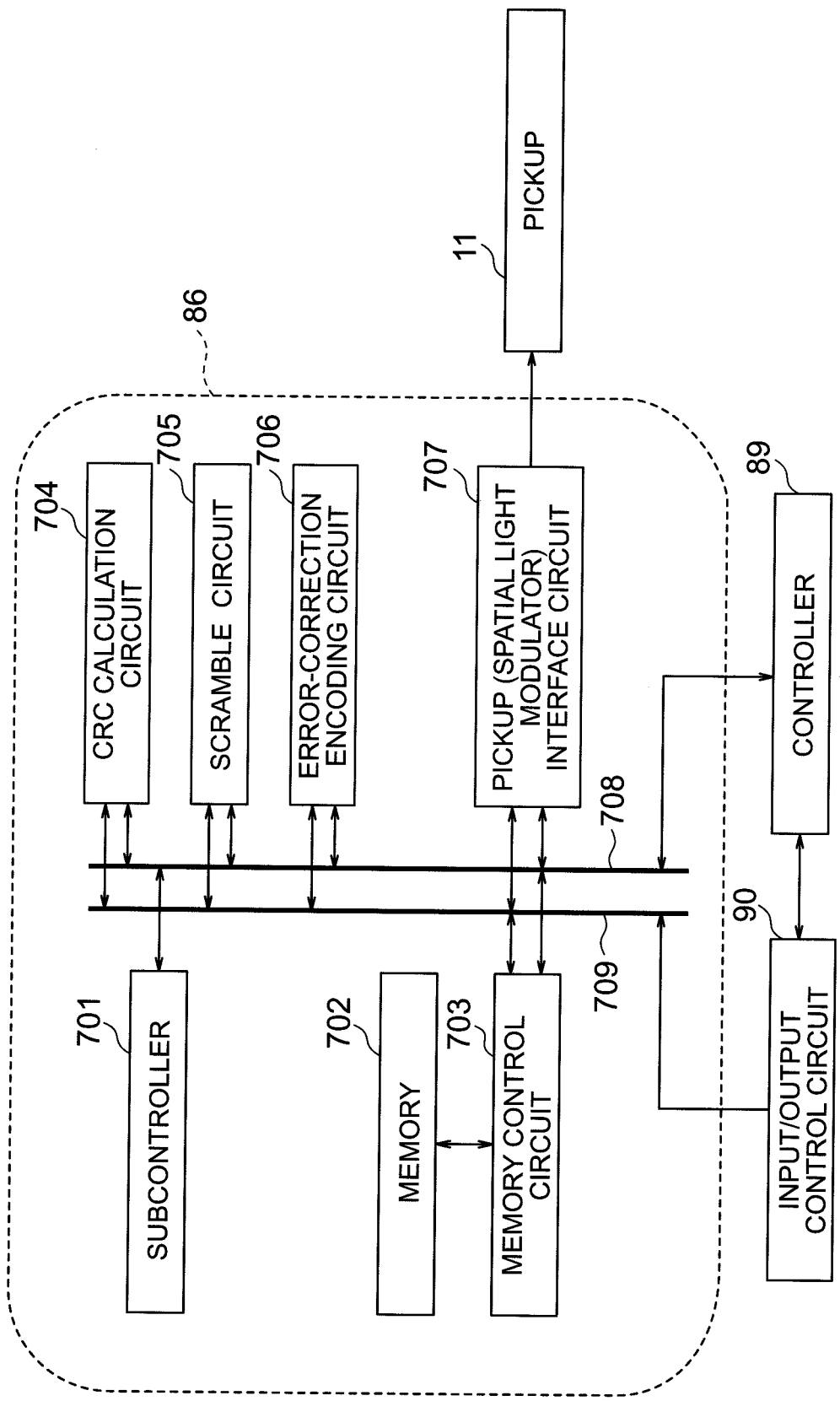
FIG. 7 is a schematic diagram for illustrating an embodiment of a signal generation circuit inside the optical-information recording/reproducing apparatus.

FIG. 7 is a block diagram of the signal generation circuit 86 of the optical-information recording/reproducing apparatus 10.

When the input of the user data is started into the input/output control circuit 90, the input/output control circuit 90 issues, to the controller 89, a notice to the effect that the input of the user data is started. Having received this notice, the controller 89 issues, to the signal generation circuit 86, an instruction of performing the recording processing of the 1-page-amount data inputted from the input/output control circuit 90. This recording-processing instruction from the controller 89 is transmitted to a subcontroller 701 inside the signal generation circuit 86 via a control-use line 708. Having received this instruction, the subcontroller 701 performs controls over respective signal processing circuits via the control-use line 708 in such a manner as to cause the respective signal processing circuits to be operated in parallel to each other. First, the subcontroller 701 controls a memory control circuit 703 to store, into a memory 702, the user data inputted from the input/output control circuit 90 via a data line 709. If the user data stored into the memory 702 has attained to a certain constant amount, a CRC calculation circuit 704 performs a control of executing the CRC implementation of the user data. Next, a scramble circuit 705 applies the scramble processing to the CRC-implemented data, which adds a pseudo-random-number data string to this data. Moreover, an error-correction encoding circuit 706 performs a control of executing the error-correction encoding processing to the scrambled data, which adds a parity data string to this data. Finally, the subcontroller 701 causes a pickup interface circuit 707 to read the error-correction-encoded data from the memory 702 in accordance with an arrangement sequence of the two-dimensional data on the spatial light modulator 312. The subcontroller 701, after adding the marker which becomes the criterion at the reproducing time, transfers the marker-added two-dimensional data to the spatial light modulator 312 inside the pickup 11.

Figure 8:
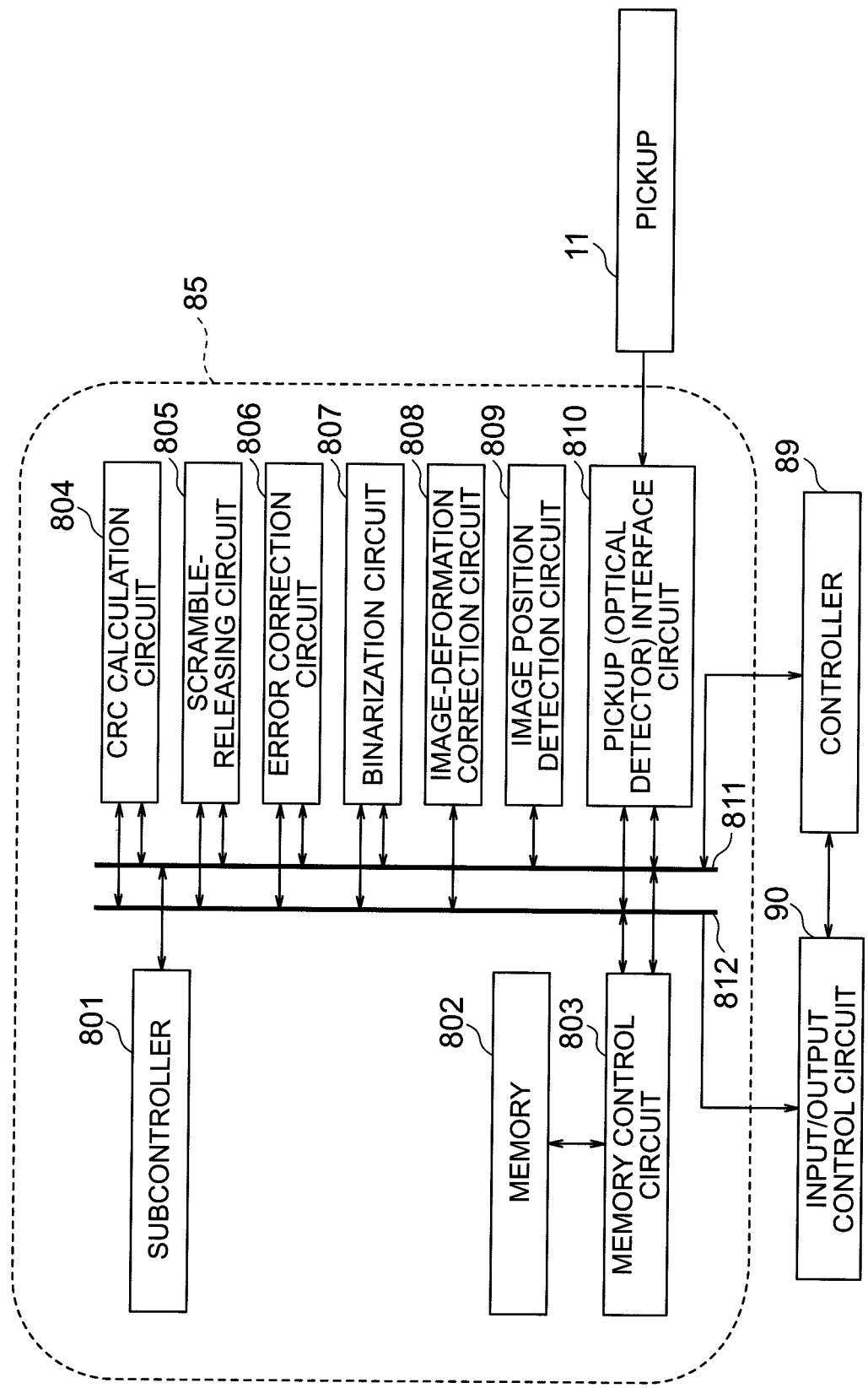
FIG. 8 is a schematic diagram for illustrating an embodiment of a signal processing circuit inside the optical-information recording/reproducing apparatus.

FIG. 8 is a block diagram of the signal processing circuit 85 of the optical-information recording/reproducing apparatus 10.

When the image data is detected by the optical detector 325 inside the pickup 11, the controller 89 issues, to the signal processing circuit 85, an instruction of performing the reproducing processing of the 1-page-amount data inputted from the pickup 11. This reproducing-processing instruction from the controller 89 is transmitted to a subcontroller 801 inside the signal processing circuit 85 via a control-use line 811. Having received this instruction, the subcontroller 801 performs controls over respective signal processing circuits via the control-use line 811 in such a manner as to cause the respective signal processing circuits to be operated in parallel to each other. First, via a data line 812, the subcontroller 801 controls a memory control circuit 803 to store, into a memory 802, the image data inputted from the pickup 11 via a pickup interface circuit 810. If the image data stored into the memory 802 has attained to a certain constant amount, an image-position detection circuit 809 performs a control of detecting the marker out of the image data stored into the memory 802, and extracting the effective-data range. Next, using the marker detected, an image-deformation correction circuit 808 performs the correction of the image deformations, such as the image's inclination, magnification, and distortion. The correction circuit 808, then, performs a control of converting the image data into a two-dimensional data size which is expected. After that, a binarization circuit 807 performs the binarization processing of making the "0"-or-"1" judgment on each bit data of a plurality of bits which constitute the size-converted two-dimensional data. The binarization circuit 807, then, performs a control of storing the data onto the memory 802 in accordance with an arrangement sequence of the outputs of the reproduced data. Next, an error correction circuit 806 corrects an error involved in each data string, and a scramble-releasing circuit 805 releases the scramble processing which adds a pseudo-random-number data string to the data. After that, a CRC calculation circuit 804 confirms that no error is involved within the user data on the memory 802. After that, the user data is transferred to the input/output control circuit 90 from the memory 802.

Here, referring to FIG. 1, and FIG. 11 through FIG. 13, the explanation will be given below concerning a method of detecting a reference-beam wavefront aberration, and compensating the reference-beam wavefront aberration in the optical-information recording/reproducing apparatus in the present embodiment explained so far.

Figure 10:
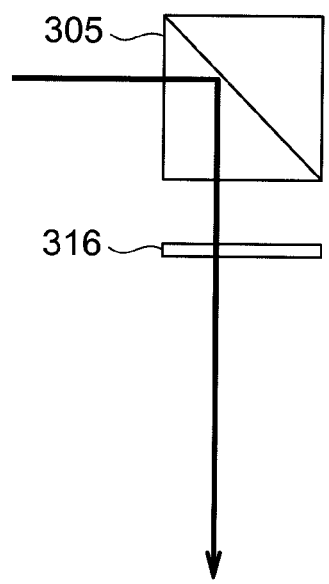
FIG. 10 is a schematic diagram for illustrating an example of the optical path inside the pickup at the time of the normal reproduction.
Figure 11:
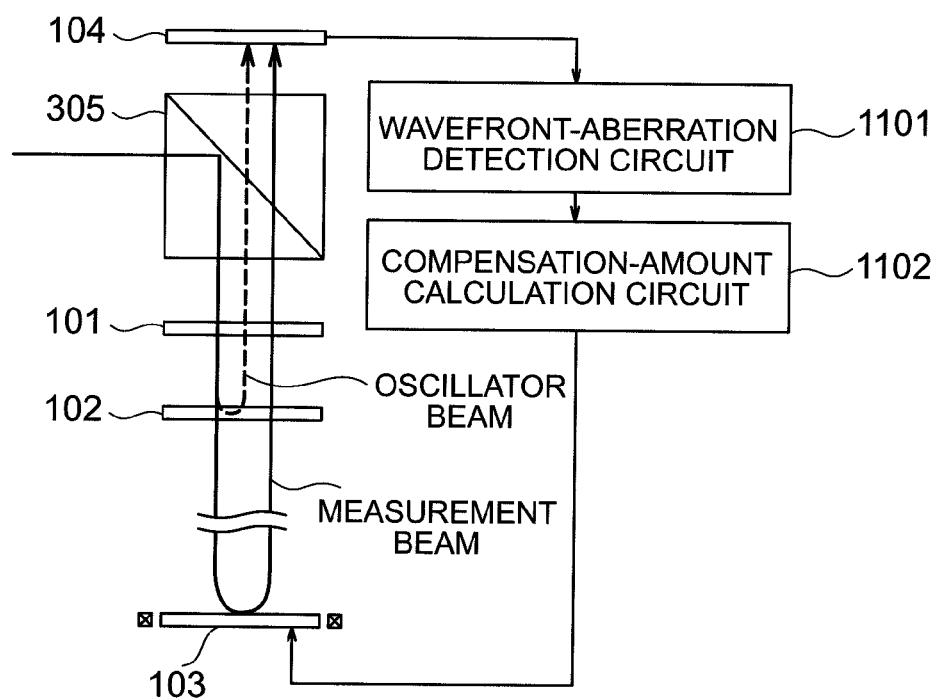
FIG. 11 is a schematic diagram for illustrating an example of the optical path inside the pickup at the time of the adjustment operation.

FIG. 1 illustrates the configuration of the pickup 11 for performing the reference-beam wavefront-aberration detection and compensation operations. FIG. 1 differs from FIG. 4 explained earlier in the following configuration components: A quarter-wavelength plate 101, a half mirror 102, a wavefront compensator 103, an optical detector 104, and a quarter-wavelength plate 105. Also, FIG. 10 and FIG. 11 illustrate paths of the optical beams in FIG. 4 and FIG. 1, respectively. The arrows in FIG. 10 and FIG. 11, however, do not indicate optical axes of the optical beams or the like, but merely indicate the pass-through sequence of the components.

In the reproducing operation in FIG. 4, the optical beam reflected by the PBS prism 305 is simply used as the reference beam as is illustrated in FIG. 10. In the wavefront-aberration compensation operation in FIG. 1, however, as illustrated in FIG. 11, the optical beam reflected by the PBS prism 305 is caused to become a circularly-polarized light by the quarter-wavelength plate 101, then entering the half mirror 102.

Subsequently, an optical beam, which has passed through the half mirror 102, is guided to enter the optical-information storage medium 1 as the reference beam as was described earlier. Moreover, the optical beam, which has passed through the optical-information storage medium 1, is reflected by the wavefront compensator 103 whose angle is made adjustable by the actuator 323. In this way, the reproduction-use reference beam is generated. Furthermore, this reproduction-use reference beam travels reversely through the original path through which it has traveled. This reproduction-use reference beam is caused to become a linearly-polarized light by the quarter-wavelength plate 101, then passing through the PBS prism 305, and entering the optical detector 104.

Meanwhile, an optical beam, which is reflected by the half mirror 102, is caused to become a linearly-polarized light by the quarter-wavelength plate 101, then passing through the PBS prism 305, and entering the optical detector 104. This optical beam will be referred to as "an oscillator beam".

Figure 12A:
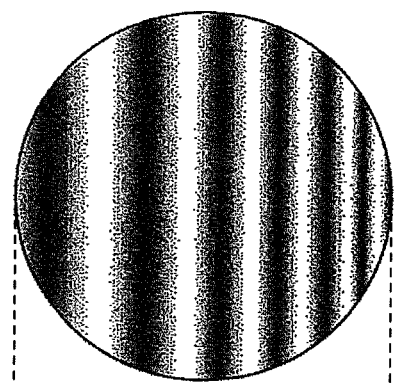
FIGS. 12A-12C are schematic diagrams for illustrating an embodiment of the processing steps of a wavefront-aberration detection circuit.
Figure 12B:
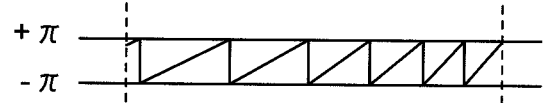
Figure 12C:
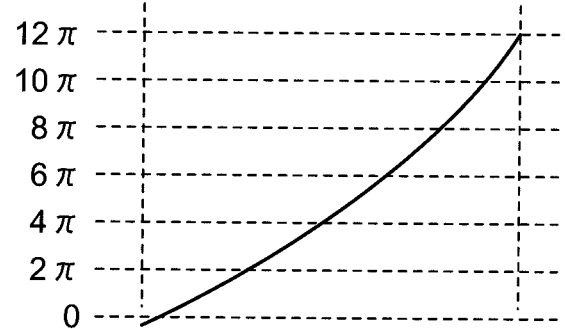
Figure 13A:
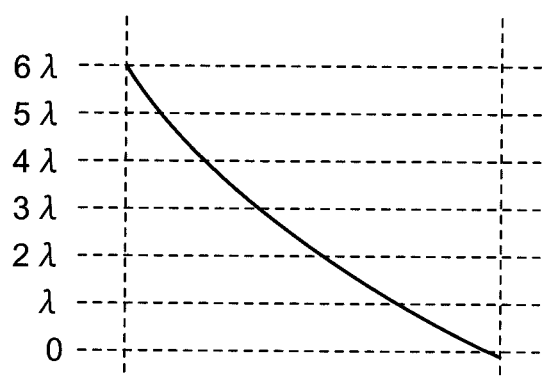
FIGS. 13A and 13B are schematic diagrams for illustrating an embodiment of the processing steps of a compensation-amount calculation circuit.
Figure 13B:
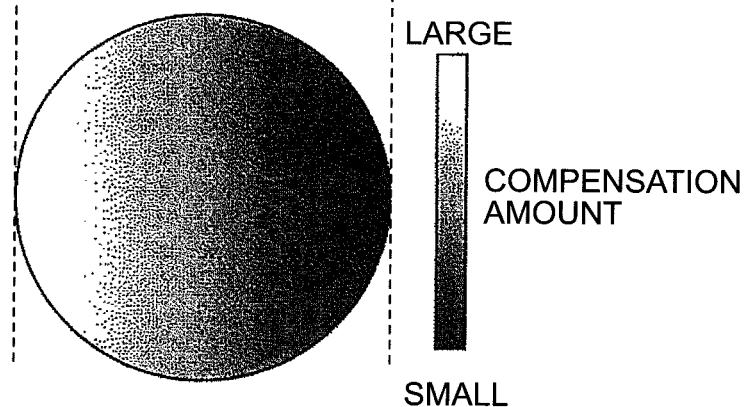

The above-described reference beam and the above-described oscillator beam interfere with each other, thereby forming an interference pattern on the optical detector 104. Moreover, from this interference pattern (FIG. 12A), a wavefront-aberration detection circuit 1101 calculates the phase difference therebetween (FIG. 12B). Then, the circuit 1101 connects the discontinuous points to each other (FIG. 12C), thereby calculating a wavefront-aberration amount. Furthermore, a compensation-amount calculation circuit 1102 calculates a compensation amount to be used for the wavefront compensator 103, so that the above-described wavefront-aberration amount calculated is canceled out by this compensation amount (FIG. 13A). The circuit 1102 controls the wavefront compensator 103 in accordance with this compensation amount (FIG. 13B). Incidentally, the method for calculating the wavefront-aberration amount in the wavefront-aberration detection circuit 1101 is not limited to the present scheme. For example, each type of interferometer-used wavefront calculation method such as pattern scan method may be used. Also, whatever optical component may be used as the wavefront compensator 103 as long as it is a wavefront-control-capable component such as deformable mirror and liquid-crystal element. Also, not being limited to the wavefront compensator 103, the position or characteristics of an element which constitutes the pickup 11 may also be controlled. Furthermore, in the present embodiment, the compensation amount is calculated directly from the wavefront-aberration amount. The wavefront compensator 103, however, may be controlled using a feedback control in such a manner that the wavefront-aberration amount becomes equal to its minimum.

Also, the reference beam, which enters the optical-information storage medium 1, is caused to become the circularly-polarized light by the employment of the present scheme. In correspondence therewith, the quarter-wavelength plate 105 in FIG. 1 is inserted so that the signal beam is also caused to become the circularly-polarized light similarly.

In the above-described explanation, the application of the present scheme to the reproducing time in FIG. 4 has been selected as the example. The present scheme, however, can also be similarly applied to the recording time in FIG. 3. This is because the optical path of the reference beam becomes the same as the one in FIG. 4 by adjusting the angle of the wavefront compensator 103 with the actuator 323. However, when the present scheme is used at the recording time, it is preferable to deploy the wavefront compensator 103 within the optical path existing by the time when the reference beam enters the optical-information storage medium 1.

Figure 16:
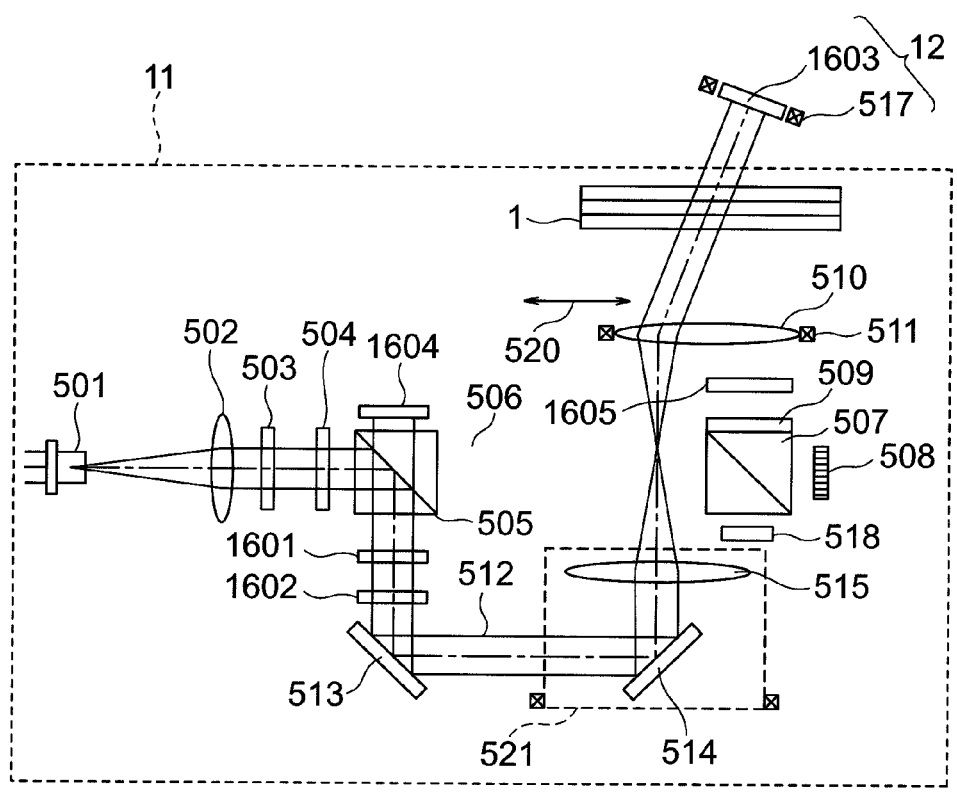
FIG. 16 is a schematic diagram for illustrating an embodiment of the pickup inside the optical-information recording/reproducing apparatus.

Moreover, FIG. 16 illustrates the configuration where the present scheme is applied to the optical system in FIG. 5. FIG. 16 differs from FIG. 5 explained earlier in the following configuration components: A quarter-wavelength plate 1601, a half mirror 1602, a wavefront compensator 1603, an optical detector 1604, and a quarter-wavelength plate 1605. Incidentally, the following embodiments can also be similarly applied to the optical system in FIG. 5.

According to the above-described configuration, it becomes possible to perform the interferometer-used wavefront-aberration detection in the hologram-based recording/reproducing optical system. This feature allows implementation of the high-accuracy wavefront-aberration compensation. Simultaneously, it becomes possible to suppress an influence of the wavefront deformation caused by the storage medium. This feature is made possible by measuring the wavefront of the reference beam existing after it has passed through the storage medium. Furthermore, it is possible to carry out the normal recording/reproducing operation and the wavefront-aberration compensation operation at the same time. This feature allows implementation of an improvement in the reproduction performance.

Figure 22:
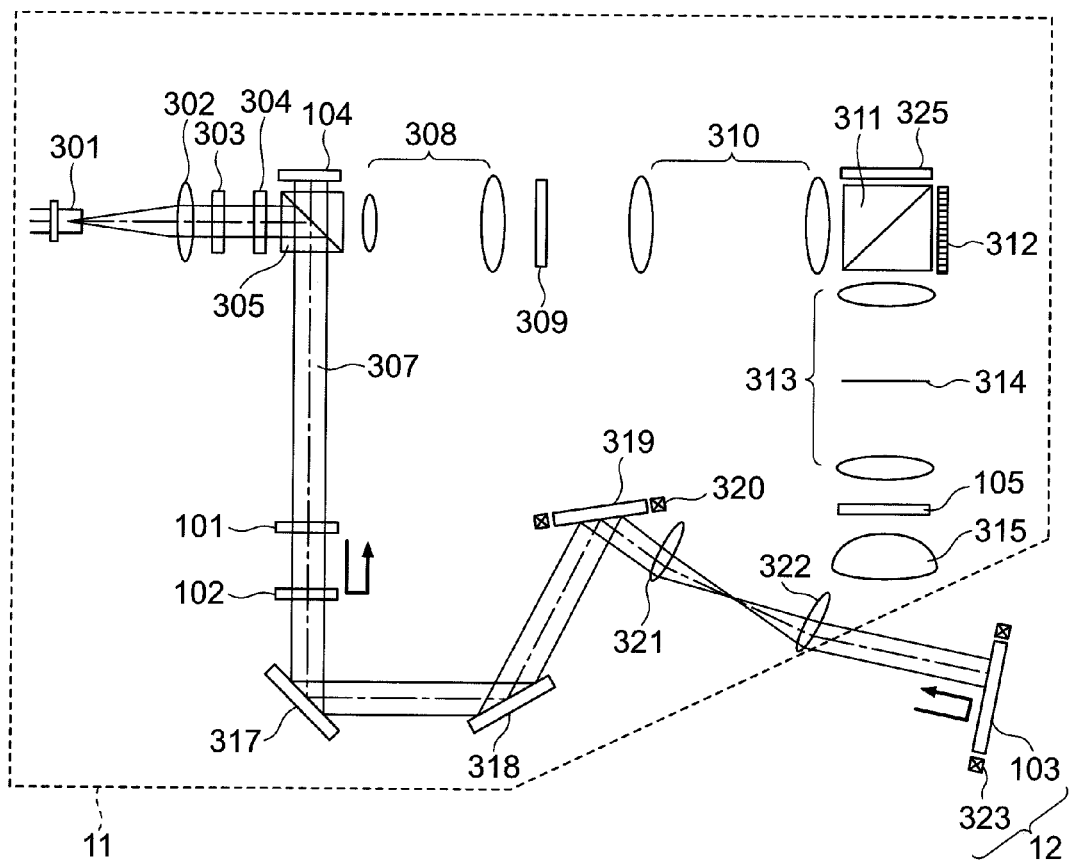
FIG. 22 is a schematic diagram for illustrating an embodiment of the pickup inside the optical-information recording/reproducing apparatus.
Figure 23:
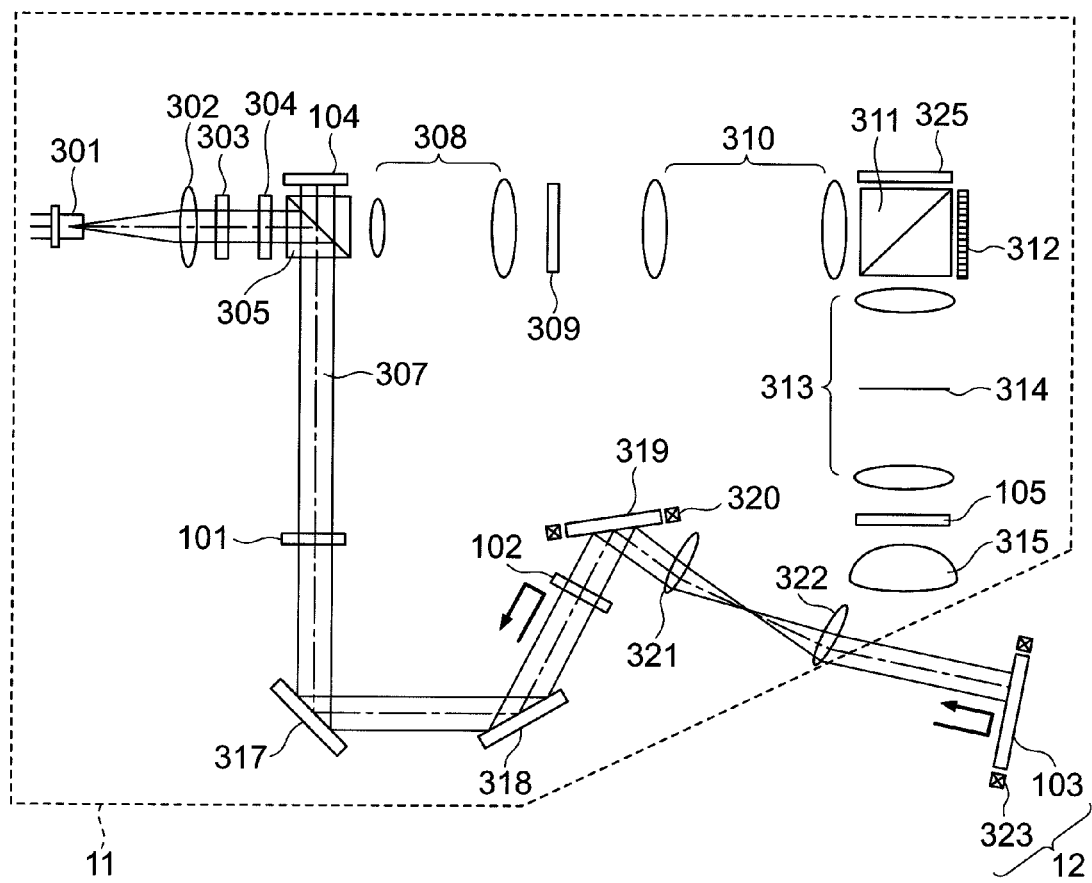
FIG. 23 is a schematic diagram for illustrating an embodiment of the pickup inside the optical-information recording/reproducing apparatus.

Incidentally, as illustrated in FIG. 22, the wavefront-aberration detection operation in the present embodiment can also be performed in a state where the optical-information storage medium 1 does not exist. This feature allows implementation of the storage-medium-independent wavefront-aberration compensation, which is effective when applied to an initial adjustment of the storage-medium-excluded optical system. Moreover, the present embodiment can also be applied to the adjustment of partial complements of the optical system. For example, if the adjustment of only the lenses 321 and 322 and the mirror 319 is wished to be made, as illustrated in FIG. 23, the half mirror 102 for generating the oscillator beam is deployed at the preceding stage to the mirror 319. This deployment allows the adjustment to be carried out in a manner of being limited to the optical system where the aberration is likely to occur. Also, in the optical system in FIG. 16, if the wavefront aberration in the objective lens becomes a problem, the measurement is made on the interference between the one reference beam before it has passed through the objective lens, and the other reference beam after it has passed through the objective lens. This measurement makes it possible to measure a disturbance of the wavefront in the objective lens, and to perform the feedback control over the disturbance. As described earlier, the control target at these adjustment times is not limited to the wavefront compensator 103, but may also be the position or characteristics of an element which constitutes the pickup 11. As explained above, the positions of the oscillator beam-generating element and the wavefront compensator 103 are not limited to the positions in FIG. 1. Namely, the element and the compensator may be inserted into, or replaced into whatever position as long as this position is included within the optical path. This condition is also applicable in the other embodiments similarly.

Embodiment 2

The present embodiment differs from the first embodiment in its wavefront-aberration detection and compensation processing steps.

Figure 14:
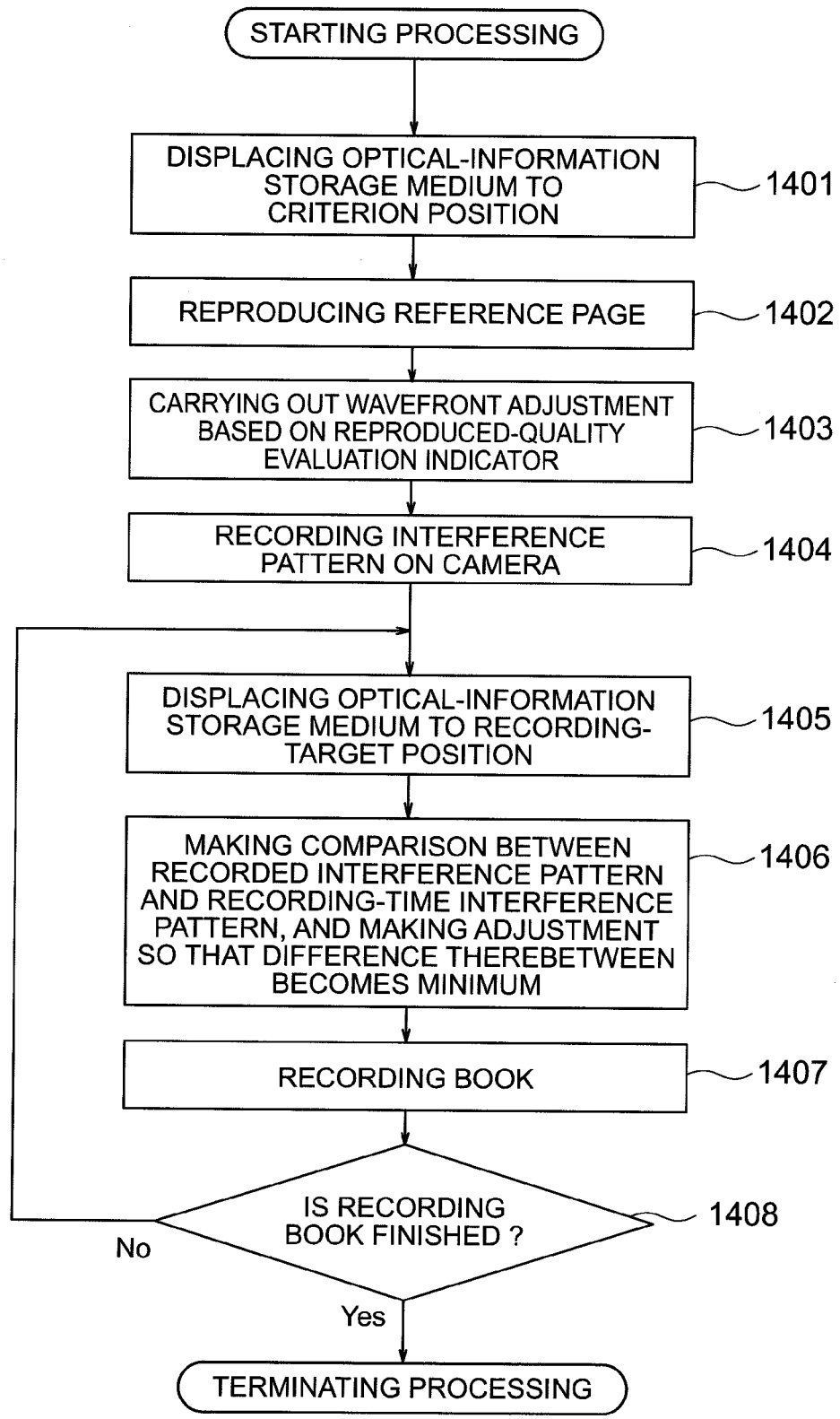
FIG. 14 is a schematic diagram for illustrating an embodiment of the operation flow of the pickup at the time of the recording operation.

FIG. 14 illustrates the flow of the wavefront-aberration compensation operation at the recording time. When, like this flow, the present embodiment is used at the recording time, it is preferable to deploy the wavefront compensator 103 within the optical path existing by the time when the reference beam enters the optical-information storage medium 1.

First, it is assumed that what is called "a reference page" is recorded in advance into the optical-information storage medium 1. Then, the optical-information storage medium 1 is displaced up to the recorded position of the reference page (: 1401). Next, this reference page is reproduced (: 1402). Moreover, the wavefront compensator 103 is controlled so that the reproduced-quality evaluation indicator such as SNR becomes the most satisfying (: 1403). Also, an interference pattern on the optical detector 104 at this time is memorized (: 1404). Next, the optical-information storage medium 1 is displaced up to a target position at which the hologram is to be recorded (: 1405). Furthermore, the compensation-amount calculation circuit 1102 makes a comparison between the memorized interference pattern and an interference pattern on the optical detector 104 at the recording time. Then, the circuit 1102 calculates a compensation amount in which the difference between the two interference patterns becomes equal to its minimum, then controlling the wavefront compensator 103 (: 1406), and recording the hologram (: 1407). This compensation-amount calculation operation at 1406 can be implemented as follows, for example: Namely, the circuit 1102 calculates a difference in the phase difference (FIG. 12C) between the memorized interference pattern and the recording-time interference pattern. Then, the circuit 1102 determines the compensation amount based on this difference. Subsequently, the operations from 1405 to 1407 are repeated until the recording has been completed (: 1408). Incidentally, a pre-recorded page may be used instead of the reference page.

Figure 15:
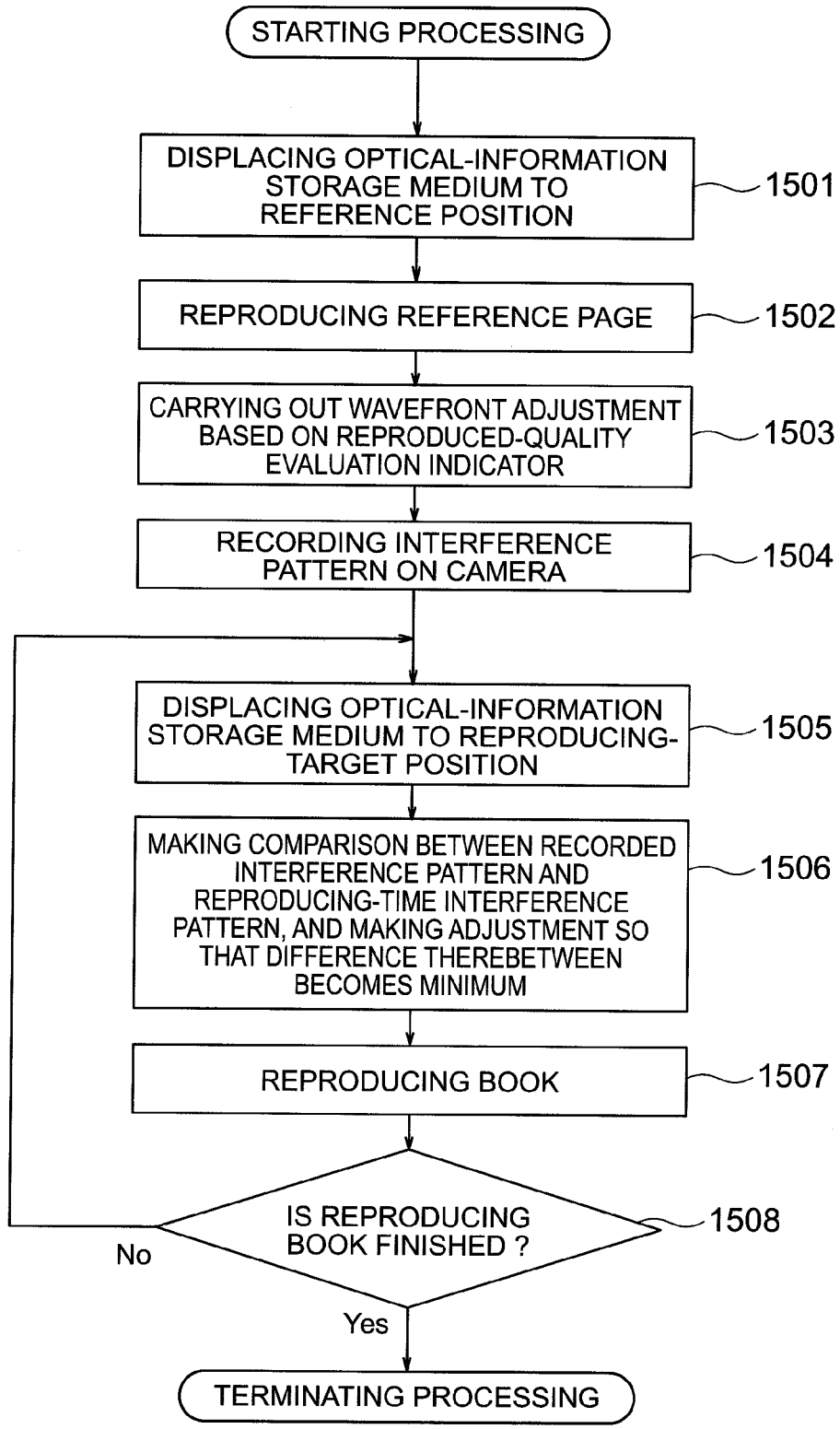
FIG. 15 is a schematic diagram for illustrating an embodiment of the operation flow of the pickup at the time of the reproducing operation.

FIG. 15 illustrates the flow of the wavefront-aberration compensation operation at the reproducing time.

First, it is assumed that what is called "a reference page" is recorded in advance into the optical-information storage medium 1. Then, the optical-information storage medium 1 is displaced up to the recorded position of the reference page (: 1501). Next, this reference page is reproduced (: 1502). Moreover, the wavefront compensator 103 is controlled so that the reproduced-quality evaluation indicator such as SNR becomes the most satisfying (: 1503). Also, an interference pattern on the optical detector 104 at this time is memorized (: 1504). Next, the optical-information storage medium 1 is displaced up to a target position at which the hologram is to be reproduced (: 1505). Furthermore, the compensation-amount calculation circuit 1102 makes a comparison between the memorized interference pattern and an interference pattern on the optical detector 104 at the reproducing time. Then, the circuit 1102 calculates a compensation amount in which the difference between the two interference patterns becomes equal to its minimum, then controlling the wavefront compensator 103 (: 1506), and reproducing the hologram (: 1507). This compensation-amount calculation operation at 1506 can be implemented as follows, for example: Namely, the circuit 1102 calculates a difference in the phase difference (FIG. 12C) between the memorized interference pattern and the reproducing-time interference pattern. Then, the circuit 1102 determines the compensation amount based on this difference. Subsequently, the operations from 1505 to 1507 are repeated until the reproducing has been completed (: 1508). Incidentally, a pre-recorded page may be used instead of the reference page.

According to the above-described processing steps, it becomes possible to perform the interferometer-used wavefront-aberration detection in the hologram-based recording/reproducing optical system. This feature allows implementation of the high-accuracy wavefront-aberration compensation. Simultaneously, it becomes possible to suppress an influence of the wavefront deformation caused by the storage medium. This feature is made possible by measuring the wavefront of the reference beam existing after it has passed through the storage medium. Furthermore, it is possible to perform the control of being capable of implementing the wavefront in which the reproduced-quality evaluation indicator becomes the most satisfying. This feature allows implementation of an improvement in the reproduction performance.

Incidentally, the present embodiment has been explained with respect to the first embodiment. The present embodiment, however, is also applicable in the other embodiments similarly.

Embodiment 3

The present embodiment differs from the first embodiment in its wavefront-aberration detection method.

Figure 17:
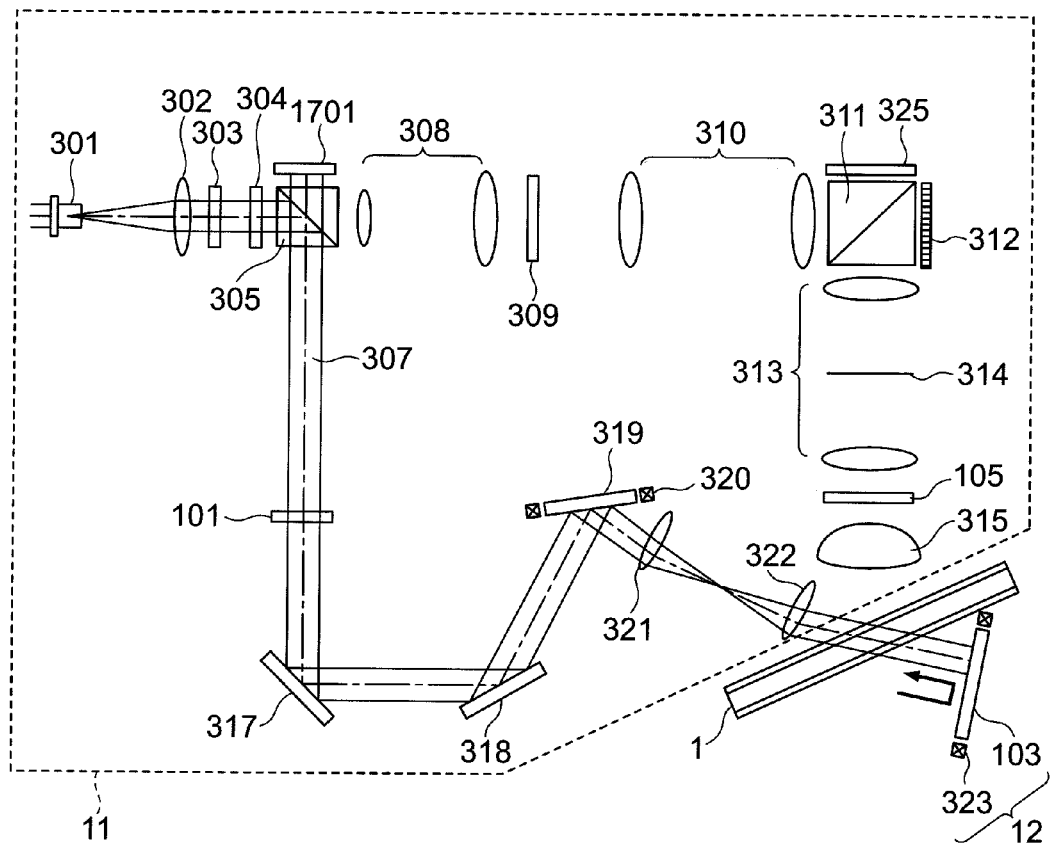
FIG. 17 is a schematic diagram for illustrating an embodiment of the pickup inside the optical-information recording/reproducing apparatus.

FIG. 17 illustrates the configuration of the pickup 11 for performing the reference-beam wavefront-aberration detection and compensation operations. FIG. 17 differs from FIG. 1 explained earlier in the following point: Namely, the half mirror 102 is not deployed, and a wavefront sensor 1701 is deployed instead of the optical detector 104.

In the wavefront-aberration compensation operation in FIG. 17, the optical beam reflected by the PBS prism 305 is caused to become the circularly-polarized light by the quarter-wavelength plate 101. Then, as was described earlier, the optical beam is guided to enter the optical-information storage medium 1 as the reference beam. Moreover, the optical beam, which has passed through the optical-information storage medium 1, is reflected by the wavefront compensator 103 whose angle is made adjustable by the actuator 323. In this way, the reproduction-use reference beam is generated. Furthermore, this reproduction-use reference beam travels reversely through the original path through which it has traveled. This reproduction-use reference beam is caused to become the linearly-polarized light by the quarter-wavelength plate 101, then passing through the PBS prism 305, and entering the wavefront sensor 1701.

This wavefront sensor 1701 can be implemented by using, e.g., a Shack-Hartmann wavefront sensor which is capable of measuring the wavefront aberration with the use of a single light-flux. Based on the wavefront aberration detected by the wavefront-aberration detection circuit 1101, the compensation-amount calculation circuit 1102 calculates the compensation amount, thereby controlling the wavefront compensator 103. Incidentally, the explanation has been given selecting the Shack-Hartmann wavefront sensor as the example of the wavefront sensor 1701 in the present embodiment. The wavefront sensor 1701, however, is not limited thereto. Namely, whatever sensor may be used as long as it is capable of measuring the wavefront aberration.

Also, the reference beam, which enters the optical-information storage medium 1, is caused to become the circularly-polarized light by the employment of the present scheme. In correspondence therewith, the quarter-wavelength plate 105 in FIG. 1 is inserted so that the signal beam is also caused to become the circularly-polarized light similarly.

According to the above-described configuration, it becomes possible to perform the wavefront-aberration detection with the employment of the simple configuration in the hologram-based recording/reproducing optical system. Simultaneously, it becomes possible to suppress an influence of the wavefront deformation caused by the storage medium. This feature is made possible by measuring the wavefront of the reference beam existing after it has passed through the storage medium. Furthermore, it is possible to carry out the normal recording/reproducing operation and the wavefront-aberration compensation operation at the same time. This feature allows implementation of an improvement in the reproduction performance.

Embodiment 4

The present embodiment differs from the first embodiment in its oscillator beam and reference-beam generation method.

FIG. 18 illustrates the configuration of the pickup 11 for performing the reference-beam wavefront-aberration detection and compensation operations. FIG. 18 differs from FIG. 4 explained earlier in the following point: Namely, a half-wavelength plate 1801 and a photonic crystal element 1802 are deployed instead of the quarter-wavelength plate 101 and the half mirror 102, and the quarter-wavelength plate 105 is not deployed.

Here, the photonic crystal element 1802 is a structural object whose refractive index changes periodically. In the present embodiment, the photonic crystal element is used as an element which is equipped with the following characteristics: Namely, a linearly-polarized light which is perpendicular to the optical axis of the photonic crystal element 1802 is permitted to pass therethrough; whereas a linearly-polarized light which is parallel thereto is reflected thereby. Whatever element, however, may be used as long as it is equipped with characteristics like this.

First, referring to FIG. 19A, the explanation will be given below regarding the recording operation in the present embodiment.

In FIG. 18, the optical beam reflected by the PBS prism 305 is guided to enter the half-wavelength plate 1801. At this time, the optical axis of the half-wavelength plate 1801 is so deployed as to become parallel or perpendicular to the polarization plane of the incident beam. Moreover, the optical axis of the photonic crystal element 1802 is so deployed as to become perpendicular to this polarization plane. This deployment permits the optical beam to pass through the photonic crystal element 1802. As was described earlier, this optical beam is guided to enter the optical-information storage medium 1 as the reference beam.

Next, referring to FIG. 19B, the explanation will be given below regarding the reproducing operation in the present embodiment.

In order to permit the reproduced beam to pass through the PBS prism 311, the polarization plane of the reference beam is required to be optically-rotated by 90° relative to the polarization plane at the recording time. Accordingly, the optical axis of the half-wavelength plate 1801 is so deployed as to become equal to 45° relative to the polarization plane of the incident beam. This deployment causes the polarization plane of the pass-through beam of the half-wavelength plate 1801 to be optically-rotated by 90°. Moreover, the optical axis of the photonic crystal element 1802 is so deployed as to become perpendicular to this polarization plane. This deployment permits the optical beam to pass through the photonic crystal element 1802. As was described earlier, this optical beam is guided to enter the optical-information storage medium 1 as the reference beam.

Next, referring to FIG. 19C, the explanation will be given below regarding the wavefront-aberration compensation operation in the present embodiment.

In FIG. 18, the optical beam reflected by the PBS prism 305 is guided to enter the half-wavelength plate 1801. At this time, the optical axis of the half-wavelength plate 1801 is so deployed as to become equal to 22.5° relative to the polarization plane of the incident beam. This deployment causes the polarization plane of the pass-through beam of the half-wavelength plate 1801 to be optically-rotated by 45°. Moreover, the optical axis of the photonic crystal element 1802 is so deployed as to become equal to 45° relative to this polarization plane. This deployment allows implementation of the following processing: Namely, of the optical beam which has entered the photonic crystal element 1802, an optical component perpendicular to the optical axis of the photonic crystal element 1802 is permitted to pass therethrough, thereby becoming the reference beam. Meanwhile, an optical component parallel thereto is reflected thereby, thereby becoming the oscillator beam. The operation hereinafter is basically the same as the one in the first embodiment.

Incidentally, it is also possible to perform the recording/reproducing operation while this wavefront-aberration compensation operation is underway. At that time, it is all right just to switch the optical axis of the photonic crystal element 1802 by 90° in harmony with the polarization plane of the reference beam which becomes necessary. This switching allows the wavefront-aberration compensation operation to be always performed as in the first embodiment.

According to the above-described configuration, the half mirror 102 in the first embodiment is not used. This feature makes it possible to suppress a loss in the optical beam. Also, it becomes possible to suppress an influence of the wavefront deformation caused by the storage medium. This feature is made possible by measuring the wavefront of the reference beam existing after it has passed through the storage medium. Furthermore, it becomes possible to perform the interferometer-used wavefront-aberration detection in the hologram-based recording/reproducing optical system. This feature allows implementation of the high-accuracy wavefront-aberration compensation. Simultaneously, it is possible to carry out the normal recording/reproducing operation and the wavefront-aberration compensation operation at the same time. This feature allows implementation of an improvement in the reproduction performance.

Incidentally, the present embodiment has been explained with respect to the first embodiment. The present embodiment, however, is also applicable in the other embodiments similarly.

Embodiment 5

The present embodiment differs from the first embodiment in its wavefront-aberration detection method.

Figure 20:
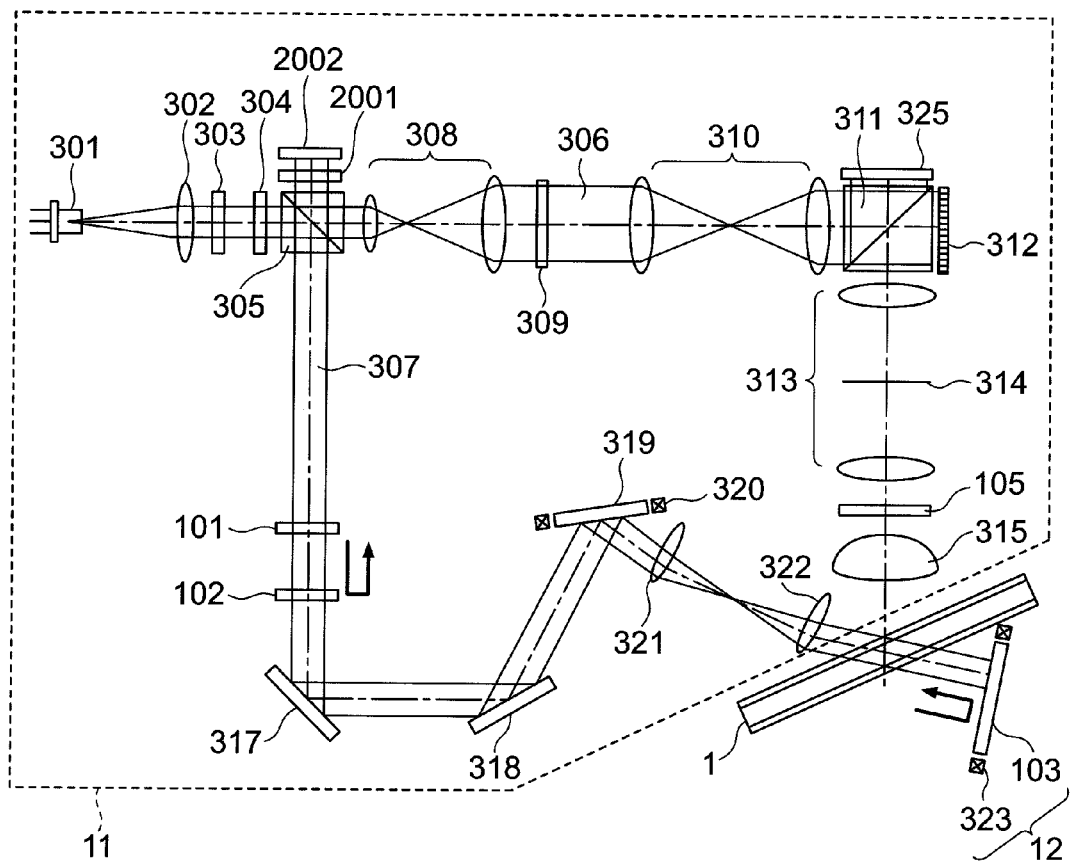
FIG. 20 is a schematic diagram for illustrating an embodiment of the pickup inside the optical-information recording/reproducing apparatus.
Figure 21:
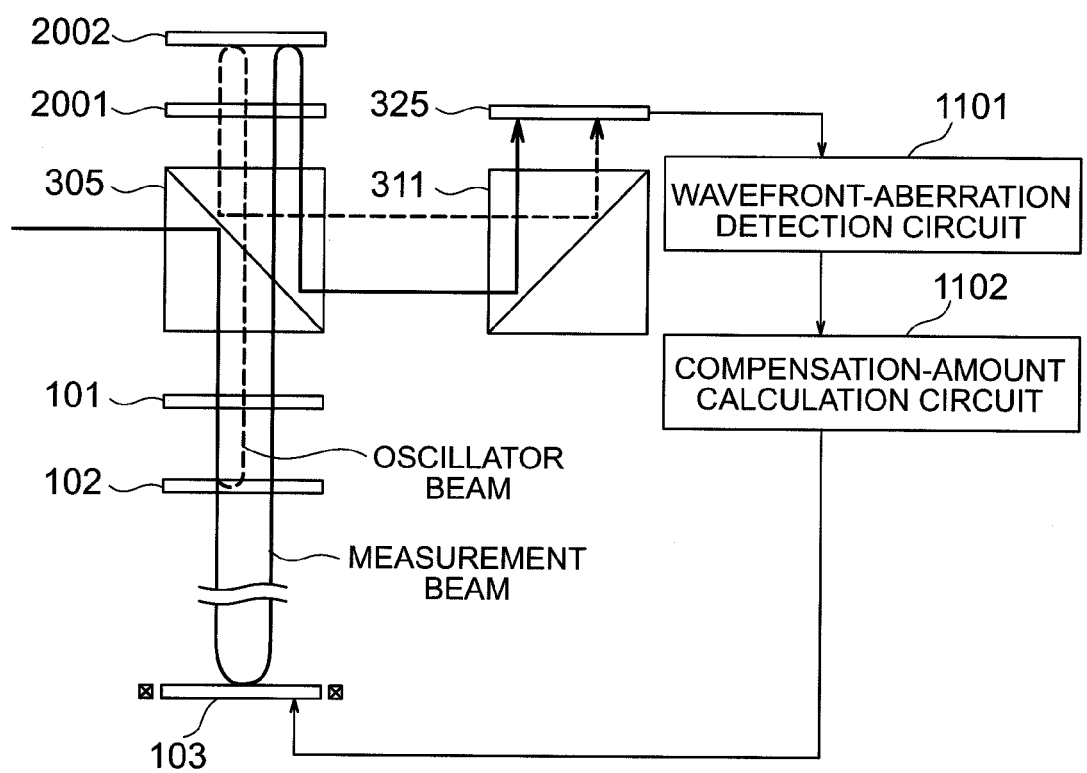
FIG. 21 is a schematic diagram for illustrating an example of the optical path inside the pickup at the time of the adjustment operation.

FIG. 20 illustrates the configuration of the pickup 11 for performing the reference-beam wavefront-aberration detection and compensation operations. FIG. 20 differs from FIG. 1 explained earlier in the following configuration components: A quarter-wavelength plate 2001 and a mirror 2002 are deployed instead of the optical detector 104. Also, FIG. 21 illustrates paths of the optical beams in FIG. 20. The arrows in FIG. 21, however, do not indicate optical axes of the optical beams or the like, but merely indicate the pass-through sequence of the components.

In the wavefront-aberration compensation operation in FIG. 20, however, as illustrated in FIG. 21, the optical beam reflected by the PBS prism 305 is caused to become a circularly-polarized light by the quarter-wavelength plate 101, then entering the half mirror 102.

Subsequently, an optical beam, which has passed through the half mirror 102, is guided to enter the optical-information storage medium 1 as the reference beam as was described earlier. Moreover, the optical beam, which has passed through the optical-information storage medium 1, is reflected by the wavefront compensator 103 whose angle is made adjustable by the actuator 323. In this way, the reproduction-use reference beam is generated. Furthermore, this reproduction-use reference beam travels reversely through the original path through which it has traveled. This reproduction-use reference beam is caused to become a linearly-polarized light by the quarter-wavelength plate 101, then passing through the PBS prism 305.

Meanwhile, an optical beam, which is reflected by the half mirror 102, is caused to become a linearly-polarized light by the quarter-wavelength plate 101, then passing through the PBS prism 305. This optical beam will be referred to as "an oscillator beam".

The above-described reference beam and the above-described oscillator beam are optically-rotated by 90° in their polarization planes in a process of travelling through the quarter-wavelength plate 2001, the mirror 2002, and the quarter-wavelength plate 2001. Moreover, these beams are reflected by the PBS prism 305. After that, these beams are reflected by the PBS prism 311 to enter the optical detector 325, thereby forming an interference pattern on the optical detector 325. Processing this interference pattern in much the same way as in the first embodiment makes it possible to perform the wavefront-aberration correction.

According to the above-described configuration, it is possible to co-use the wavefront-aberration-detection-use optical detector and the reproduction-use optical detector. This feature allows implementation of a suppression of the cost. Simultaneously, it becomes possible to suppress an influence of the wavefront deformation caused by the storage medium. This feature is made possible by measuring the wavefront of the reference beam existing after it has passed through the storage medium. Furthermore, it becomes possible to perform the interferometer-used wavefront-aberration detection in the hologram-based recording/reproducing optical system. This feature allows implementation of the high-accuracy wavefront-aberration compensation.

Incidentally, the present invention is not limited to the above-described embodiments, but includes various modified embodiments. For example, the above-described embodiments have been explained in detail in order to explain the present invention in an easy-to-understand manner. Namely, the embodiments are not necessarily limited to the ones which are equipped with all of the configurations explained. Also, a partial portion of the configuration of a certain embodiment can be replaced by the configuration of another embodiment. Also, the configuration of another embodiment can be added to the configuration of a certain embodiment. Also, the addition, deletion, and replacement of the configuration of another embodiment can be performed with respect to a partial portion of the configuration of each embodiment.

Also, a partial portion or the entire portion of the above-described components such as each configuration, each function, each processing unit, and each processing method may also be implemented using hardware such as, e.g., designing the partial portion or the entire portion using integrated circuits. Also, the above-described components such as each configuration and each function may also be implemented using software by processor's interpreting and executing the program for implementing each function. The information about each-function-implementing program, table, and file can be stored into a recording apparatus such as memory, hard disc, SSD (: Solid State Drive), or a recording medium such as IC card, SD card, and DVD.

Also, the control lines and information lines specified are limited to the ones which are conceivable as being necessary when seen from the explanation's point-of-view. Namely, all of the control lines and information lines are not necessarily specified when seen from the product's point-of-view. It is also allowable to consider that, actually, almost all of the configurations are connected to each other.

The invention claimed is:

1. An apparatus for reproducing optical-information from a hologram storage medium into which an interference pattern has been recorded as a hologram, said interference pattern being formed by causing an original reference beam, and a reproduced beam that includes page data, to interfere with each other, said optical-information reproducing apparatus comprising:

an optical detector configured to detect said reproduced beam including said page data, said reproduced beam being acquired after illuminating said original reference beam onto said recorded hologram and after said original reference beam is diffracted by said recorded hologram;

an optical element configured to generate a first reference beam and a second reference beam, by branching said original reference beam, such that said first reference beam does not enter said hologram storage medium but said second reference beam does enter said hologram storage medium;

a wavefront detector configured to detect a wavefront of said original reference beam, by causing said first reference beam and a third reference beam to interfere with each other, wherein said third reference beam corresponds to said second reference beam after entering and passing through said hologram storage medium in a linear direction, without diffraction; and a wavefront compensator configured to compensate a wavefront of said third reference beam or a fourth reference beam based on an output of said wavefront detector, wherein said fourth reference beam corresponds to said second reference beam before entering said hologram storage medium.

2. The apparatus for reproducing optical-information from a hologram storage medium according to claim 1, wherein said wavefront compensator is configured to adjust said wavefront of said third reference beam or said fourth reference beam, based on a reproduction quality of said recorded hologram;

wherein said output of said wavefront detector is memorized as a reference wavefront; and wherein when a desired hologram is reproduced, said wavefront compensator is configured to adjust said wavefront of said third reference beam or said fourth reference beam, based on a comparison result between said output of said wavefront detector and said reference wavefront.

3. The apparatus for reproducing optical-information from a hologram storage medium according to claim 1, wherein said wavefront detector and said optical detector are used with one another.

4. An apparatus for recording an interference pattern into a hologram storage medium as a hologram, said interference pattern being formed by causing an original reference beam, and a another reference beam that includes page data, to interfere with each other, said optical-information recording apparatus comprising:

an optical element configured to generate a first reference beam and a second reference beam, by branching said original reference beam;

a wavefront detector configured to detect a wavefront of said original reference beam, by causing said first reference beam and a third reference beam to interfere with each other, wherein said third reference beam corresponds to said second reference beam after entering and passing through said hologram storage medium in a linear direction, without diffraction; and a wavefront compensator configured to compensate a wavefront of said third reference beam or a fourth reference beam based on an output of said wavefront detector, wherein said fourth reference beam corresponds to said second reference beam before entering said hologram storage medium.

5. The recording apparatus according to claim 4, further comprising:

an optical detector configured to detect said reproduced beam including said page data, said reproduced beam being acquired after illuminating said original reference beam onto said recorded hologram and after said original reference beam is diffracted by said recorded hologram;

wherein said wavefront compensator is configured to adjust said wavefront of said third reference beam or said fourth reference beam, based on a reproduction quality of said recorded hologram;

wherein said output of said wavefront detector is memorized as a reference wavefront, wherein when a desired hologram is reproduced, said wavefront compensator is configured to adjust said wavefront of said third reference beam or said fourth reference beam, based on a comparison result between said output of said wavefront detector and said reference wavefront.

6. The recording apparatus according to claim 4, further comprising:

an optical detector configured to detect said reproduced beam including said page data, said reproduced beam being acquired after illuminating said original reference beam onto said recorded hologram and after said original reference beam is diffracted by said recorded hologram;

wherein said wavefront detector and said optical detector are used with one another.

7. An optical-information recording/reproducing method for recording an interference pattern into a hologram storage medium as a hologram, and reproducing said interference pattern from said hologram storage medium into which said hologram is recorded, said interference pattern being formed by causing an original reference beam, and a reproduced beam that includes page data, to interfere with each other, said optical-information recording/reproducing method comprising the steps of:

illuminating said recorded hologram with said original reference beam, and detecting said reproduced beam including said page data acquired after being diffracted by said recorded hologram;

generating a first reference beam and a second reference beam, by branching said original reference beam;

detecting a wavefront of said original reference beam including said page data, by causing said first reference beam and a third reference beam to interfere with each other, wherein said third reference beam corresponds to said second reference beam after entering and passing through said hologram storage medium in a linear direction, without diffraction; and adjusting a wavefront of said third reference beam, or of a fourth reference beam, based on said detected wavefront, wherein said fourth reference beam corresponds to said second reference beam before entering said hologram storage medium.

* * * * *